(12) United States Patent
Dallarosa et al.

(10) Patent No.: US 10,399,183 B2
(45) Date of Patent: Sep. 3, 2019

(54) MULTIPLE BEAM ADDITIVE MANUFACTURING

(71) Applicant: IPG Photonics Corporation, Oxford, MA (US)

(72) Inventors: Joseph Dallarosa, Uxbridge, MA (US); William O'Neill, Cambridge (GB); David Squires, Lebanon, CT (US); Martin Sparkes, Shingay Cum Wendy (GB); Andrew Payne, Trumpington (GB)

(73) Assignee: IPG PHOTONICS CORPORATION, Oxford, MA (US)

(*) Notice: Subject to any disclaimer, the term of this patent is extended or adjusted under 35 U.S.C. 154(b) by 503 days.

(21) Appl. No.: 15/179,566

(22) Filed: Jun. 10, 2016

(65) Prior Publication Data

US 2017/0021454 A1   Jan. 26, 2017

Related U.S. Application Data

(60) Provisional application No. 62/173,541, filed on Jun. 10, 2015.

(51) Int. Cl.
*B23K 26/342* (2014.01)
*B33Y 10/00* (2015.01)
(Continued)

(52) U.S. Cl.
CPC .......... *B23K 26/342* (2015.10); *B22F 3/1055* (2013.01); *B23K 26/0604* (2013.01);
(Continued)

(58) Field of Classification Search
None
See application file for complete search history.

(56) References Cited

U.S. PATENT DOCUMENTS 4,232,324 A   11/1980 Tsao
4,900,130 A   2/1990 Haas
(Continued)

FOREIGN PATENT DOCUMENTS

WO   2014095872 A1   6/2014
WO   2014179345 A1   11/2014
(Continued)

OTHER PUBLICATIONS

PCT Search Report and Written Opinion dated Sep. 9, 2016, received in corresponding PCT Application No. PCT/US16/36999, 11 pgs.
(Continued)

*Primary Examiner* — Geoffrey S Evans
(74) *Attorney, Agent, or Firm* — Grossman, Tucker, Perreault & Pfleger, PLLC

(57) ABSTRACT

Systems and methods for multiple beam additive manufacturing use multiple beams of light (e.g., laser light) simultaneously to expose layers of powder material in selected regions until the powder material fuses to form voxels, which form build layers of a three-dimensional structure. The light may be generated from selected light sources and coupled into an array of optical fibers having output ends arranged in an optical head such that the multiple beams are directed by the optical head to different locations on each of the powder layers. The multiple beams may provide distributed exposures forming a distributed exposure pattern including beam spots that are spaced sufficiently to separate the fused regions formed by each exposure. The multiple beams may be moved using various techniques (e.g., by moving the optical head) and according to various scan patterns such that a plurality of multiple beam distributed exposures form each build layer.

39 Claims, 12 Drawing Sheets

(51) Int. Cl.

| | |
|---|---|
| *B33Y 30/00* | (2015.01) |
| *B23K 26/064* | (2014.01) |
| *B23K 26/082* | (2014.01) |
| *B23K 26/06* | (2014.01) |
| *B23K 26/073* | (2006.01) |
| *B23K 26/08* | (2014.01) |
| *B22F 3/105* | (2006.01) |
| *B29C 64/153* | (2017.01) |
| *B29C 64/20* | (2017.01) |
| *B23K 103/08* | (2006.01) |
| *B33Y 50/02* | (2015.01) |

(52) U.S. Cl.
CPC ........ *B23K 26/0626* (2013.01); *B23K 26/073* (2013.01); *B23K 26/082* (2015.10); *B23K 26/0869* (2013.01); *B29C 64/153* (2017.08); *B29C 64/20* (2017.08); *B33Y 10/00* (2014.12); *B33Y 30/00* (2014.12); *B22F 2003/1056* (2013.01); *B23K 2103/08* (2018.08); *B33Y 50/02* (2014.12); *Y02P 10/295* (2015.11)

(56) References Cited

U.S. PATENT DOCUMENTS

| | | | |
|---|---|---|---|
| 5,393,482 A | 2/1995 | Benda et al. | |
| 5,841,566 A | 11/1998 | Minakuchi et al. | |
| 6,051,179 A | 4/2000 | Hagenau | |
| 6,069,680 A | 5/2000 | Kessler et al. | |
| 6,180,050 B1 | 1/2001 | Arai et al. | |
| 7,048,528 B2 | 5/2006 | Ishikawa et al. | |
| 8,221,850 B2 | 7/2012 | Fuwa | |
| 8,652,974 B2 | 2/2014 | Piwczyk | |
| 2002/0093115 A1 | 7/2002 | Jang et al. | |
| 2002/0149137 A1 | 10/2002 | Jang et al. | |
| 2005/0133527 A1* | 6/2005 | Dullea | B05B 7/14 222/1 |
| 2005/0191016 A1 | 9/2005 | Ishikawa et al. | |
| 2006/0192322 A1* | 8/2006 | Abe | B22F 3/1055 264/497 |
| 2010/0233012 A1* | 9/2010 | Higashi | B22F 3/1055 419/9 |
| 2013/0025325 A1 | 1/2013 | Piwczyk et al. | |
| 2013/0270750 A1 | 10/2013 | Green | |
| 2014/0163717 A1 | 6/2014 | Das et al. | |
| 2014/0198365 A1 | 7/2014 | Li et al. | |
| 2014/0252687 A1 | 9/2014 | El-Dasher et al. | |
| 2014/0263209 A1* | 9/2014 | Burris | B23K 26/034 219/121.62 |
| 2014/0265049 A1* | 9/2014 | Burris | B23K 26/034 264/497 |
| 2014/0271328 A1* | 9/2014 | Burris | B23K 26/034 419/53 |
| 2014/0356472 A1 | 12/2014 | Oberhofer et al. | |
| 2015/0060422 A1 | 3/2015 | Liebl et al. | |
| 2015/0202687 A1* | 7/2015 | Pialot | B22F 3/1055 419/55 |
| 2015/0343664 A1* | 12/2015 | Liu | B28B 1/001 419/1 |
| 2016/0136730 A1* | 5/2016 | McMurtry | G02B 26/02 425/162 |

FOREIGN PATENT DOCUMENTS

| | | |
|---|---|---|
| WO | 2014199149 A1 | 12/2014 |
| WO | 2015040433 A2 | 3/2015 |

OTHER PUBLICATIONS

PCT Search Report and Written Opinion dated Sep. 1, 2016, received in corresponding PCT Application No. PCT/US16/37021, 12 pgs.
"AM250 Laser Melting (metal 3D printing) Machine", http://www.renishaw.com, Jul. 2014, 2 pgs.
Fraunhofer ILT, Press Release, "Selective Laser Melting: New machine design and exposure concept facilitates scalable productivity and building space", Nov. 13, 2014, pp. 1-2.

* cited by examiner

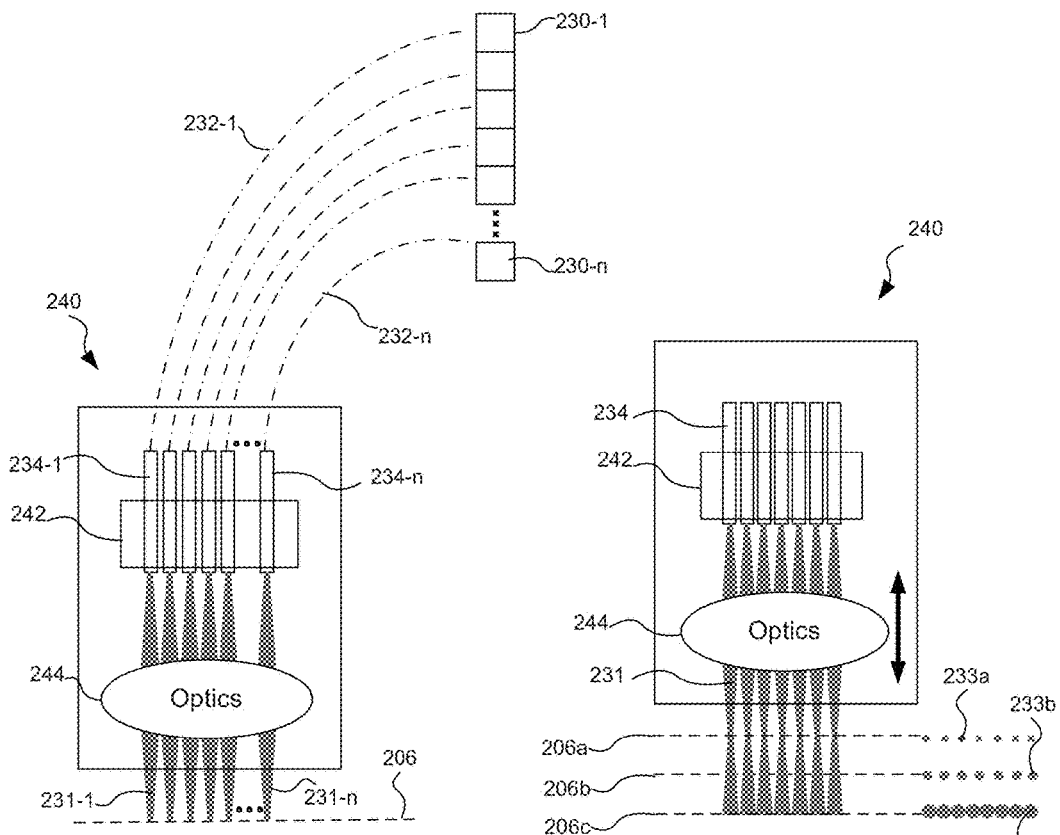
FIG. 2
FIG. 2A
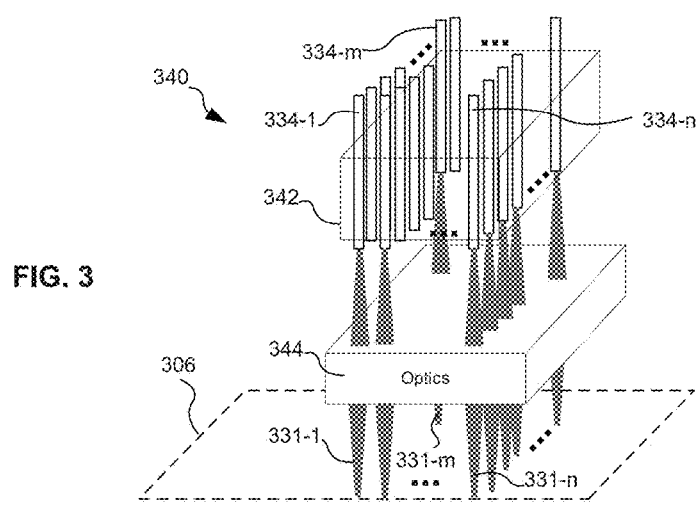
FIG. 3

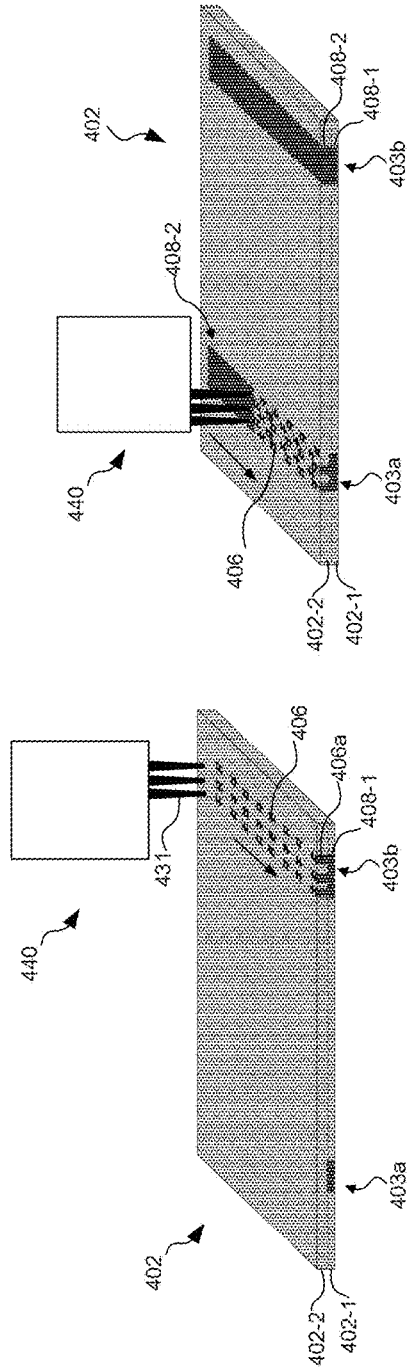
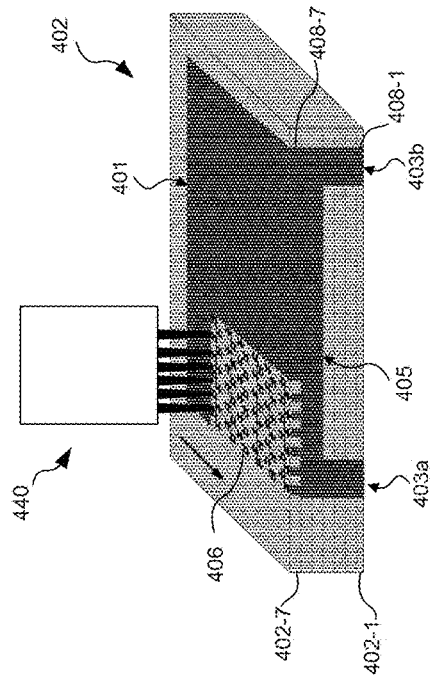
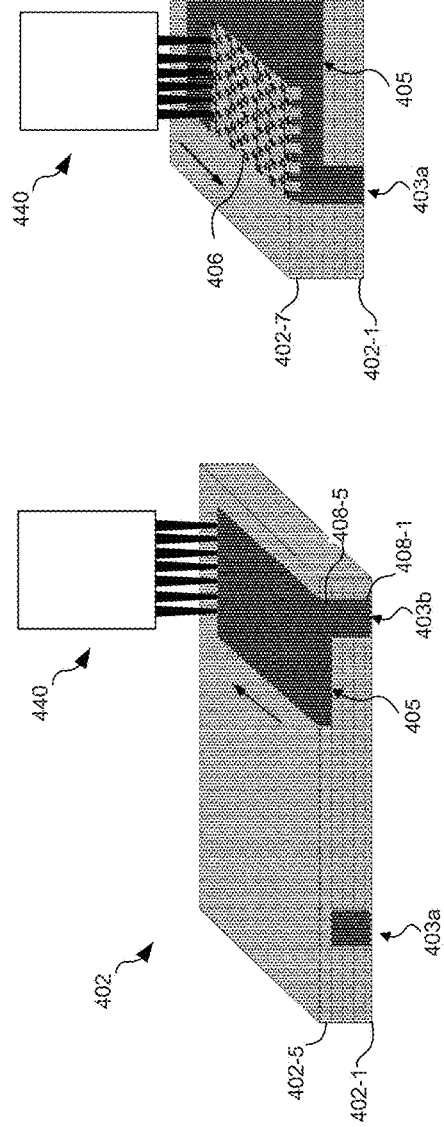

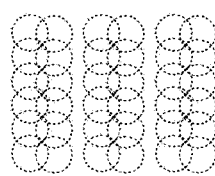
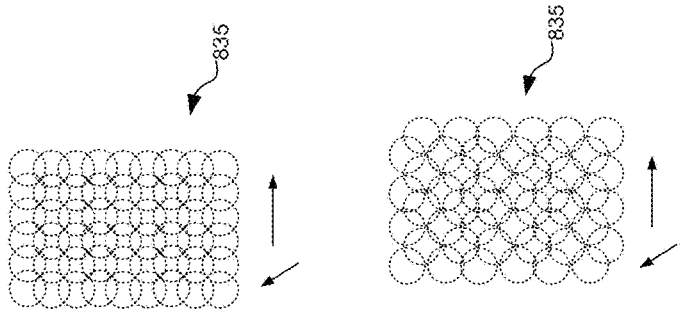
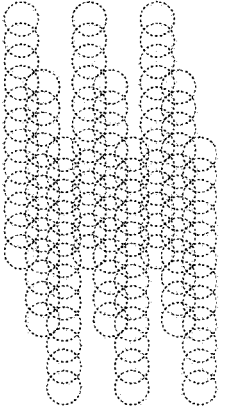
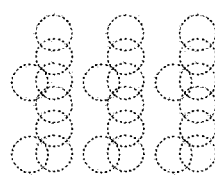
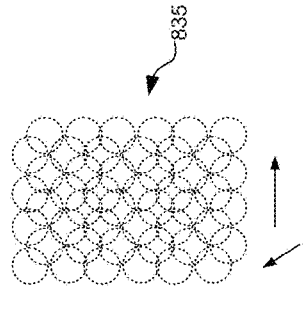
FIG. 8A
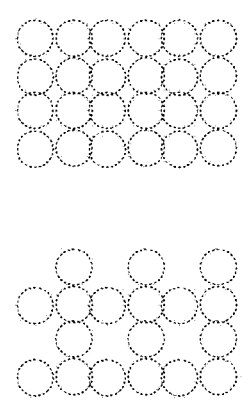
FIG. 10
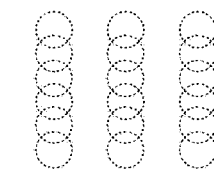
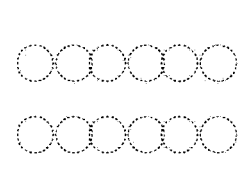
FIG. 8B
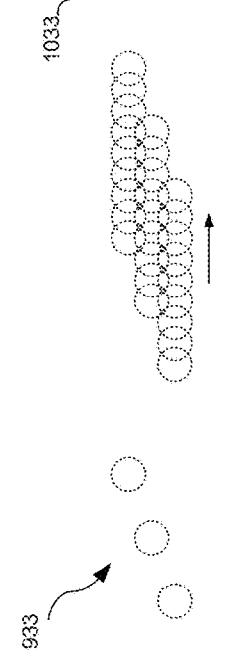
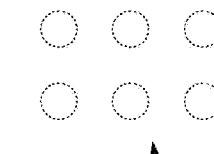
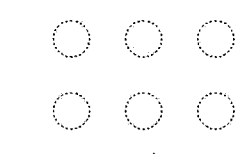
FIG. 9

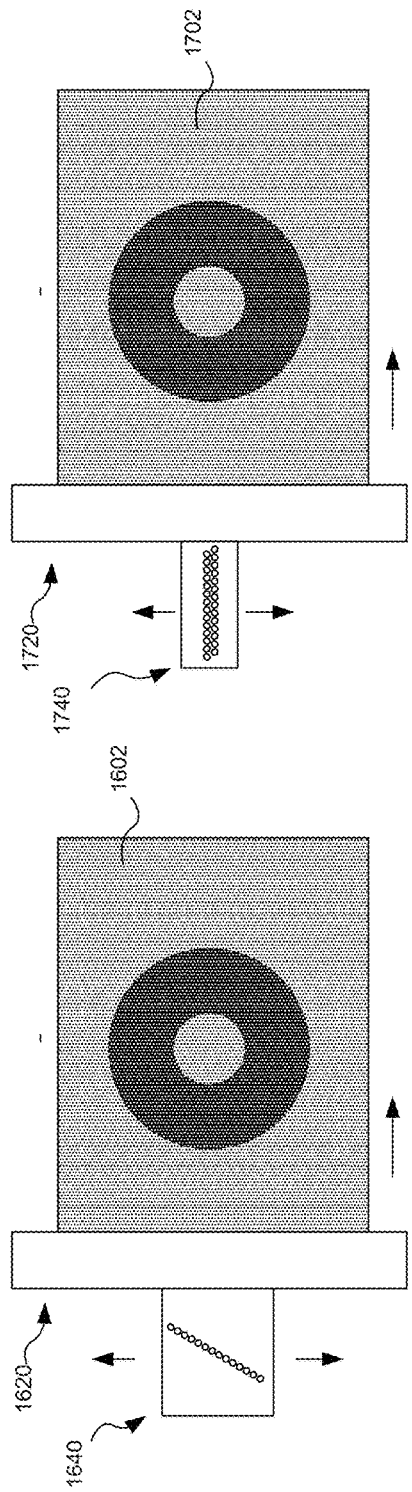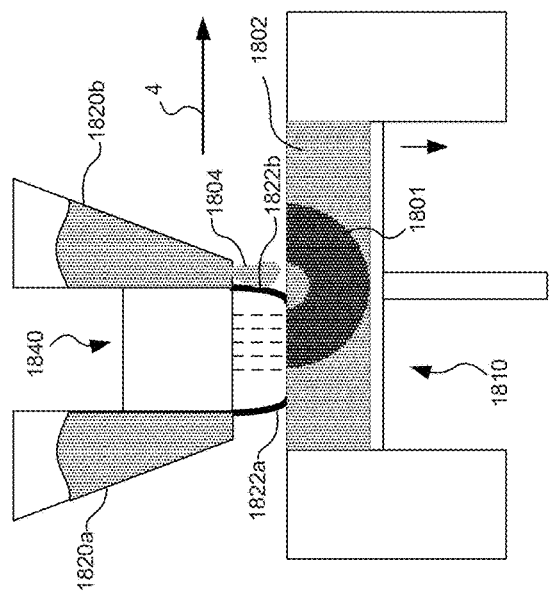

MULTIPLE BEAM ADDITIVE MANUFACTURING

CROSS-REFERENCE TO RELATED APPLICATIONS

The present application claims the benefit of U.S. Patent Application Ser. No. 62/173,541 filed Jun. 10, 2015, which is fully incorporated herein by reference.

BACKGROUND OF THE DISCLOSURE

Field of the Disclosure

The present disclosure relates to additive manufacturing and more particularly, to multiple beam additive manufacturing.

Background Art Discussion

Additive manufacturing (also known as three-dimensional printing) techniques have been used to manufacture three-dimensional structures of almost any shape. Using an additive process, successive layers of material are deposited to form the structure based on data defining a 3D model of the structure. In some methods, the successive layers forming the structure are produced by depositing successive layers of powder material and using a light beam (e.g., laser light) to bind or fuse the powder material in selected regions of each layer. Examples of these methods include selective laser sintering (SLS) wherein the laser sinters the powder particles in the selected regions to form each build layer of the structure and selective laser melting (SLM) wherein the laser melts the powder in the selected regions such that the melted material hardens to form each build layer of the structure.

Although such laser additive manufacturing (LAM) techniques have been successful, the movement of the laser to the selected regions often slows the build rate and the speed of manufacturing. Multiple beams have been used in an effort to increase speeds, but scanning multiple beams across the powder layers may result in stresses being created in the fused material of each build layer. The thermal energy, for example, may cause thermal part stress, which may deform the three-dimensional structure as the build layers are formed. As such, LAM techniques have not been as successful when used with certain materials such as superalloys because thermal stresses may result in cracking. Also, LAM techniques have not been as successful when used with powder material having larger particle sizes because the power of the laser may not be sufficient to melt and fuse larger particles sizes without causing excessive thermal stress.

Moreover, faster build rates generally require energy to be introduced into the powder bed faster (i.e., at higher power). Increasing the power of a LAM system is challenging because optical elements must be larger and cooling must be increased to withstand the higher power. The scanning mirror in such systems becomes less responsive with the increased size, which decreases the scanning speed and reduces build speed. Attempts at using multiple beams in SLM systems have been unsuccessful because of the challenges involved with scanning the same area with multiple beams.

Accordingly, there is a need for an additive manufacturing system and method that allows faster build rates while reducing thermal stresses in the fused material.

SUMMARY OF THE DISCLOSURE

Consistent with an embodiment, a method is provided for multiple beam additive manufacturing of a three-dimensional structure formed by a plurality of build layers. The method includes: providing an array of light sources and an array of optical fibers coupled to the array of light sources, respectively, and an optical head including output ends of the optical fibers; delivering powder layers of powder material on a powder bed support system that moves vertically and incrementally to accommodate each of the powder layers; and forming build layers of the three-dimensional structure in each of the powder layers of powder material, wherein forming each of the build layers includes performing multiple beam distributed exposures on different regions of each powder layer to selectively fuse corresponding regions of the powder material, wherein performing each of the multiple beam distributed exposures includes simultaneously generating light from selected light sources in the array of light sources such that beams of light are emitted from the output ends of the optical fibers coupled to the selected light sources and directed to the corresponding regions of each powder layer to form a distributed exposure pattern including spaced beam spots, wherein the beams of light are directed with a power and duration sufficient to melt the powder material in the corresponding regions such that the powder material in the corresponding regions fuses to form fused regions, wherein the beam spots in each of the multiple beam distributed exposures are spaced sufficiently to separate the fused regions formed by each of the multiple beam distributed exposures, wherein each of the fused regions corresponds to a voxel of the three-dimensional structure and wherein the fused regions of the powder material in each of the powder layers collectively form each of the respective build layers of the three-dimensional structure.

Consistent with another embodiment, a method is provided for multiple beam additive manufacturing of a three-dimensional structure formed by a plurality of build layers. The method includes: delivering a powder layer of powder material to a powder bed support system; forming a build layer of the three-dimensional structure in the powder layer of powder material, wherein forming the build layer includes performing multiple beam distributed exposures on different regions of the powder layer to selectively fuse corresponding regions of the powder material in the powder layer, wherein performing each of the multiple beam distributed exposures includes simultaneously directing light beams to the corresponding regions of the powder layer to form a distributed exposure pattern including spaced beam spots, wherein the beams of light are directed with a power and duration sufficient to melt the powder material in the corresponding regions such that the powder material in the corresponding regions fuses to form fused regions, wherein the beam spots in each of the multiple beam distributed exposures are spaced sufficiently to separate the fused regions formed by each of the multiple beam distributed exposures, and wherein the fused regions of the powder material formed by the multiple beam distributed exposures collectively form the build layer; and repeating the delivering a powder layer and the forming a build layer in the powder layer to form each of the build layers of the three-dimensional structure and wherein each of the fused regions corresponds to a voxel of the three-dimensional structure.

Consistent with a further embodiment, a method is provided for multiple beam additive manufacturing of a three-dimensional structure. The method includes: providing an array of light sources and an array of optical fibers coupled to the array of light sources, respectively, and an optical head including output ends of the optical fibers; receiving build instructions for each build layer of the three-dimensional structure, the build instructions including at least optical head positioning data defining a position of the optical head and light source data identifying selected light sources and a power and exposure time for the selected light sources; and forming each build layer of the three-dimensional structure by moving the optical head relative to powder layers of powder material in accordance with the optical head positioning data while activating selected light sources in accordance with the light source data to provide multiple beam distributed exposures to corresponding selected regions of the layers of powder material to fuse the powder material in the corresponding selected regions, wherein the fused regions of the powder material in each of the layers form the build layers of the three-dimensional structure.

Consistent with yet another embodiment, a multiple beam additive manufacturing system includes a powder bed support system for supporting a powder bed and a three-dimensional structure formed therein and for moving the powder bed vertically and incrementally to accommodate multiple powder layers of powder material and a powder delivery system for delivering each of the powder layers to form the powder bed. The multiple beam additive manufacturing system also includes an array of light sources for generating light, an array of optical fibers coupled to the light sources, respectively, and a multiple beam optical head including output ends of the optical fibers. The multiple beam additive manufacturing system further includes a control system for controlling the array of light sources, the powder bed support system, and the powder delivery system in coordination to form build layers of the three-dimensional structure in each of the powder layers delivered to the powder bed. The control system is configured to selectively control each of the light sources to generate light from selected light sources in the array of light sources such that the light is emitted from the output ends of the optical fibers and directed to corresponding regions of each of the powder layers to perform multiple beam distributed exposures with distributed exposure patterns including spaced beam spots. A power and duration of the light sources is controlled such that the beam spots melt the powder material in the corresponding regions of the powder layers causing the powder material to fuse in spaced fused regions that form voxels of the three-dimensional structure.

BRIEF DESCRIPTION OF THE DRAWINGS

These and other features and advantages will be better understood by reading the following detailed description, taken together with the drawings wherein:

FIG. 2 is a schematic diagram of a one-dimensional multiple beam optical head for use in the multiple beam additive manufacturing system, consistent with an embodiment of the present disclosure.

FIG. 2A is a schematic diagram of the one-dimensional multiple beam optical head shown in FIG. 2 with the imaging optics in different positions to provide different beam spot sizes and spacings, consistent with another embodiment of the present disclosure.

FIG. 3 is a schematic diagram of a two-dimensional multiple beam optical head for use in the multiple beam additive manufacturing system, consistent with an embodiment of the present disclosure.

FIGS. 4A-4D illustrate the formation of build layers of an example three-dimensional structure in a powder bed by scanning with a multiple beam optical head, consistent with embodiments of the present disclosure.

FIGS. 8A and 8B illustrate scan patterns for two-dimensional multiple beam distributed exposures, consistent with embodiments of the present disclosure.

FIG. 9 illustrates a scan pattern for an angled one-dimensional multiple beam distributed exposure, consistent with embodiments of the present disclosure.

FIG. 10 illustrates a scan pattern for a staggered two-dimensional multiple beam distributed exposure, consistent with embodiments of the present disclosure.

FIG. 16 is a top schematic view of a one-dimensional angled multiple beam optical head coupled to a powder delivery system for exposing a powder layer as the powder layer is delivered, consistent with another embodiment of the present disclosure.

FIG. 17 is a top schematic view of a two-dimensional staggered multiple beam optical head coupled to a powder delivery system for exposing a powder layer as the powder layer is delivered, consistent with another embodiment of the present disclosure.

FIG. 18 is a side schematic view of a multiple beam optical head coupled between hoppers of a powder delivery system for exposing a powder layer as the powder layer is delivered, consistent with yet another embodiment of the present disclosure.

DETAILED DESCRIPTION

Figure 1:
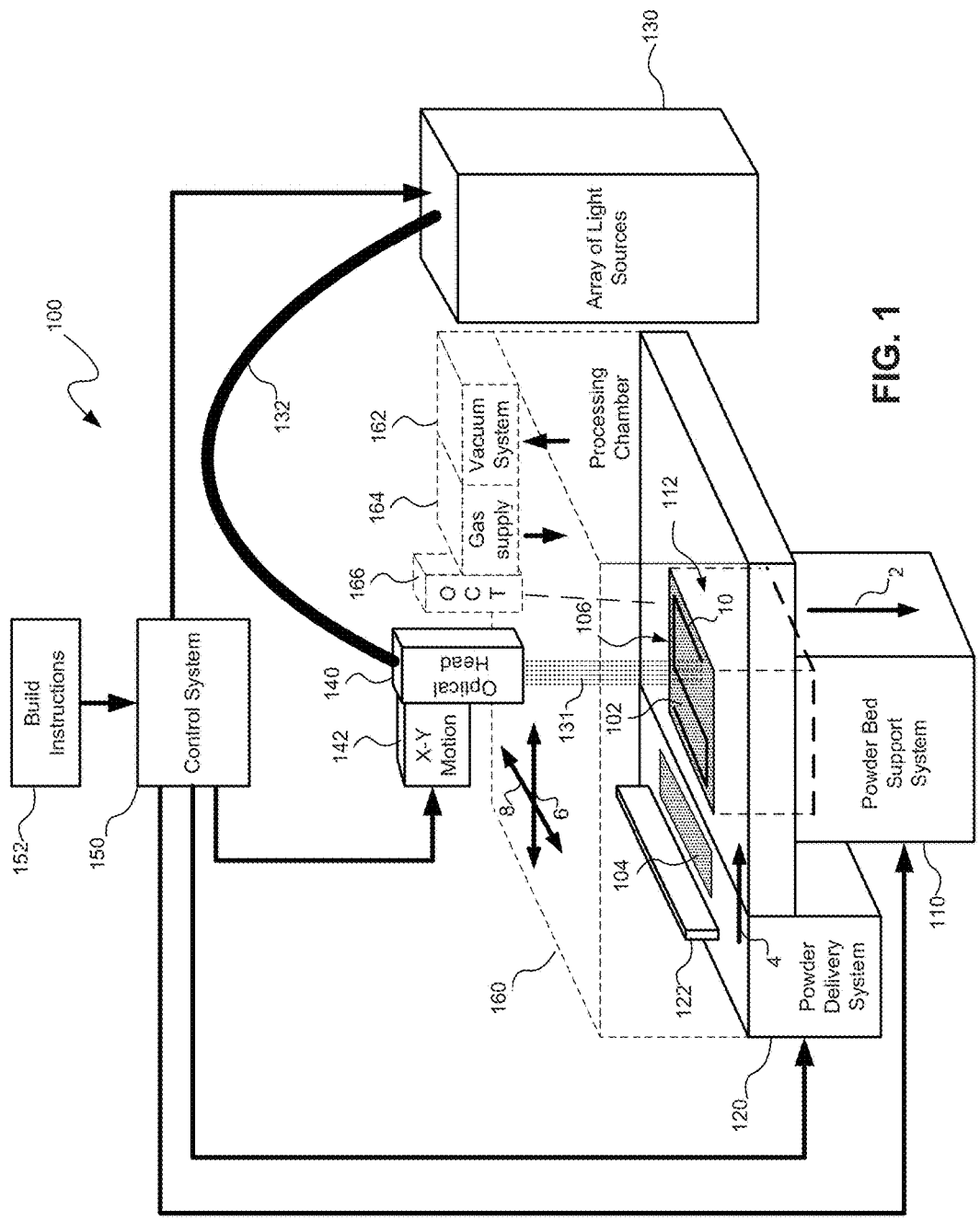
FIG. 1 is a schematic diagram of a multiple beam additive manufacturing system used to form a three-dimensional structure from layers of powdered material, consistent with an embodiment of the present disclosure.

Systems and methods for multiple beam additive manufacturing, consistent with the present disclosure, use multiple beams of light (e.g., laser light) simultaneously to expose layers of powder material in selected regions until the powder material fuses to form voxels, which form build layers of a three-dimensional structure. The light may be generated from selected light sources and coupled into an array of optical fibers having output ends arranged in an optical head such that the multiple beams are directed by the optical head to different locations on each of the powder layers. The multiple beams may provide distributed exposures forming a distributed exposure pattern including beam spots that are spaced sufficiently to separate the fused regions formed by each exposure. The multiple beams may be moved using various techniques (e.g., by moving the optical head) and according to various scan patterns such that a plurality of multiple beam distributed exposures form each build layer.

By using multiple beam distributed exposures and by using certain scan strategies, the multiple beam additive manufacturing system and method may increase build speeds while reducing stresses caused in the build layers. The multiple beam additive manufacturing system may be used to form three-dimensional structures for a wide range of three-dimensional printing or rapid prototyping applications and from a variety of materials depending upon the application. The powder material may include, without limitation, metals, alloys and superalloys. More specifically, the powder materials may include, without limitation, powdered Ti-6Al-4V, nickel titanium or nitinol, nickel based superalloys (e.g., austenite nickel-chromium-based superalloys known as Inconel) aluminum, stainless steel and cobalt chrome. Stainless steel 316L and cobalt chrome, for example, both provide good corrosion resistance and high strength. Stainless steel may be used, for example, for food processing or medical applications due to its sterilisability and resistance to fatigue and shock. Cobalt chrome may be used, for example, for medical implants due to its high wear resistance and ability to form small features with high strength. The powder material may also include any other powder material known for use in powder bed fusion additive manufacturing.

Because of the higher powers available when using multiple lasers, particularly fiber lasers, the particle size of the powders may not be an issue when using the multiple beam additive manufacturing systems and methods described herein. The multiple beam additive manufacturing systems and methods may be used with powders having asymmetric particle sizes, including particle sizes smaller than 5 μm and particle sizes greater than 30 μm. The multiple beam additive manufacturing systems and methods may also be used with powders having larger particle sizes, for example, greater than 50 μm.

As used herein, "exposure" refers to an exposure of light for a defined period of time and "multiple beam distributed exposure" refers to an exposure using multiple beams such that the beams provide spaced exposures in different locations at substantially the same time. As used herein, "powder material" refers to a material in the form of particles suitable for use in powder bed fusion additive manufacturing. As used herein, "fuse" refers to combining particles of powder material together as a single structure as a result of melting and/or sintering. As used herein, the terms "melt pool" and "melt ball" are used interchangeably to refer to a three-dimensional region of melted powder material formed by an exposure to a light beam. A "melt pool" or "melt ball" may have a generally spherical or spheroid shape but is not necessarily limited to any particular shape. As used herein, a "fused region" is a region of powder material that has been fused as a result of an exposure of a light beam forming a "melt pool" or "melt ball" and "distributed fused regions" refers to "fused regions" that are separated and formed generally simultaneously by a multiple beam distributed exposure. As used herein, a "voxel" is a unit of three-dimensional space in a three-dimensional structure. A "voxel" may correspond to a "melt pool" or "melt ball" or "fused region" but is not necessarily the same size and shape as the melt pool or melt ball or fused region.

Although the example embodiments described herein are used primarily for powder additive manufacturing using metal powders, the concepts described herein may be used with other materials and other types of additive manufacturing using lasers or light. Other materials may include, for example, resins, plastics, polymers and ceramics.

Referring to FIG. 1, a multiple beam additive manufacturing system 100, consistent with embodiments of the present disclosure, is shown and described in greater detail. The multiple beam additive manufacturing system 100 includes a powder bed support system 110 for supporting a powder bed 102 formed by successive layers of powder material 104 and a powder delivery system 120 for delivering layers of the powder material 104 onto the powder bed 102. The build layers of the three-dimensional structure are formed in the respective powder layers of the powder bed 102.

The multiple beam additive manufacturing system 100 also includes an array of light sources 130 coupled to an array of optical fibers 132 and an optical head 140 that arranges output ends of the optical fibers 132 to direct multiple light beams 131 to a processing surface 106 including the exposed layer of the powder bed 102. When forming a build layer in the exposed powder layer on the powder bed 102, an exposure by one or more of the light beams 131 melts the exposed powder material, which causes the powder material to fuse in a fused region corresponding to a voxel of the build layer. A multiple beam exposure with multiple beams at different locations may thus form multiple voxels of a build layer simultaneously. The light beams 131 may also be used to perform other operations to facilitate melting and fusion of the powder material, such as preheating and/or annealing.

In the illustrated embodiment, an optical head motion system 142 moves the optical head 140 relative to the powder bed 102 such that the light beams 131 may be directed to different locations on the powder bed 102 to form the voxels that make up the build layer. The optical head motion system 142 may be capable of moving the optical head 140 at speeds in a range of about 1-2 m/s, although slower and faster speeds are possible. A control system 150 controls the powder bed support system 110, the powder delivery system 120, the light sources 130, and the optical head motion system 142 in coordination to form each of the build layers of the three-dimensional structure. In particular, the control system 150 may cause the optical head 140 to be scanned across a powder layer according to a scan pattern 10

(e.g., similar to a dot matrix printer) while selectively activating light sources 130 such that exposures by the light beams 131 selectively create melt pools and fused regions that result in the individual voxels that form the build layers of the three-dimensional structure. The optical head 140 may also be rotated with respect to the optical head motion system 142.

The powder bed support system 110 lowers the powder bed 102 (e.g., in the direction of arrow 2) to accommodate each new layer of powder material 104, thereby defining a build envelope 112 that encompasses the powder bed 102 and the three-dimensional structure formed therein. The powder bed support system 110 may include, for example, a piston driven support platform (not shown). The powder bed support system 110 lowers the powder bed 102 incrementally by an amount corresponding to the desired thickness of each new powder layer. The build envelope 112 is shown with a cuboid shape but may also have a cylindrical shape. In one example, the powder bed support system 110 defines a cylindrical build envelope with a maximum build diameter of 100 mm and height of 70 mm and with a 25 μm resolution for each powder layer.

The powder delivery system 120 includes a powder spreader 122, such as a roller or a wiper, for spreading each of the layers of powder material 104 onto the powder bed 102. The powder delivery system 120 may include, for example, a powder delivery piston (not shown) that moves powder material upward to be engaged by the powder spreader 122. In other embodiments, the powder delivery system 120 may include one or more hoppers or similar devices that deliver powder material from above the powder bed 102.

The powder bed 102 and processing surface 106 may be enclosed in a processing chamber 160. The processing chamber 160 may be an air-tight chamber with a processing window (not shown) to allow the light beams 131 to pass into the chamber 160 to the powder bed 102. The processing chamber 160 may also be atmospherically controlled to reduce oxidation effects when performing the melting and fusion of the powder material. A vacuum system 162 may be used to remove oxygen from the processing chamber 160. A gas supply 164 may supply an inert gas, such as argon, to the processing chamber 160 to replace the oxygen.

The multiple beam additive manufacturing system 100 may further include an optical coherence tomography (OCT) system 166 to provide in-process metrology for each build layer. The OCT system 166 may use known OCT techniques to image the processing plane 106 at the location of one or more of the exposures to obtain size and shape information about any melt pool. OCT may be an on-line single point interferometric depth determination.

The array of light sources 130 may include an array of diode lasers, such as high power multi-mode fiber-coupled diode lasers. One example of such a diode laser is the PLD-33 series available from IPG Photonics Corp., which is capable of up to 30 W of output power in the 974 nm wavelength range (i.e., 958-980 nm) with a coupled optical fiber having an aperture of 105-110 μm, a fiber cladding diameter of 125 μm and a fiber buffer diameter of 250 μm. Other diode lasers with other power outputs (e.g., 10, 60, or 100 W) and/or other wavelengths may also be used. Diode lasers of different power outputs and/or wavelengths may also be used in the same array.

The output power of the diode lasers may be changed, for example, by changing the drive current of the diode laser. This may be done before each exposure to affect variable power delivery or during exposure to affect pulse shaping.

The energy delivered by each exposure may be changed, for example, by changing the output power, the pulse duration, pulse shape, and the focus or beam spot size. The multiple beam additive manufacturing system 100 may thus be scalable in power density.

In other embodiments, the array of light sources 130 may include fiber lasers, such as a green fiber laser with a wavelength of about 532 nm. Green fiber lasers may include pulsed (e.g., nanosecond) green fiber lasers with peak powers greater than 150 kW and up to 400 kW, continuous wave fiber lasers with output powers up to 50 W, and quasi-continuous wave (QCW) fiber lasers with output powers up to 100 W or up to 500 W. Examples of such fiber lasers include the GLR series single-mode, single-frequency continuous wave green fiber lasers and the GLPN series high power, single mode, quasi-continuous wave green fiber lasers available from IPG Photonics Corp. Other fiber lasers at other wavelengths, such as IR wavelengths (e.g., 1 micron, 1.5 micron, and 2 micron), may also be used as light sources 130 in the multiple beam additive manufacturing system 100. The fiber lasers are capable of providing higher powers, for example, to fuse powder material with larger particle sizes and/or higher melting temperatures.

These are only some examples of the light sources that may be used in the multiple beam additive machining system 100. The array of light sources 130 may include any type of light sources capable of delivering light of sufficient power to melt and fuse the powder material being used. In some instances, for example, a higher power white light source may be sufficient.

In other embodiments, the light sources 130 may include one or more light sources capable of performing other operations or processes, for example, to facilitate melting and fusion of the powder material and/or to form a finish surface on the three-dimensional structure. Different light sources may be used, for example, depending on the power and/or the beam characteristics (e.g., beam quality and spot size) desired for a particular processing operation. One or more multi-mode lasers producing lower intensity beams and larger focused spot sizes may be used, for example, to perform processes that do not require higher power density and higher resolution, such as pre-heating the powder and/or annealing the fused regions. Single mode lasers producing higher intensity beams and smaller focused spot sizes may be used for processes that do require higher power densities and higher resolution, such as the melting that creates the voxels in the powder material. One or more ultrafast lasers, such as picosecond or femtosecond lasers, producing high peak power may be used, for example, to form a laser induced periodic surface structure (LIPSS) on a surface of the three-dimensional structure.

Although the multiple beam additive manufacturing system 100 is described as including the array of light sources 130 coupled, respectively, to the array of fibers 132, additionally or alternatively, the system 100 may include a single light source coupled to multiple fibers. A single laser, for example, may be split and coupled to multiple fibers to deliver multiple beams of light for purposes of pre-heating, annealing, or other processes that do not require higher power and higher resolution. In other embodiments, the multiple beam additive manufacturing system 100 may include more than one optical head 140 coupled to other arrays of light sources or to other single light sources.

Although the example embodiment uses the optical head 140 to arrange output ends of optical fibers 132 to direct multiple beams to the processing surface 106, other techniques and systems may be used to direct multiple beams toward the processing surface 106 to form an array of beam spots on the processing surface 106 for use in the methods described herein. Multiple beams of light may be directed toward the processing surface 106, for example, by directing light sources (e.g., laser diodes) toward the processing surface 106, using other types of laser processing heads (e.g., similar to laser welding heads) directed toward the processing surface 106, and/or using mirrors or other optical components to direct light beams toward the processing surface 106.

The optical head motion system 142 may include an X-Y motion stage configured to move the optical head in at least X and Y directions as indicated by arrows 6, 8. One example of the optical head motion system 142 includes a CNC gantry system such as an Aerotech® gantry system with an XYZ stage. Another example of the optical head motion system 142 may include a printer-style carriage for moving the optical head 140 above the processing chamber 160. A printer-style carriage may be coupled, for example, to the powder delivery system 120 such that the optical head 140 scans and exposes the powder layer as the layer is delivered, as will be described in greater detail below. In other embodiments, the beams 131 may be moved relative to the powder bed 102 by scanning the beams using scanning optics such as a polygon mirror or a galvo scanner, as will be described in greater detail below.

The control system 150 controls the powder bed support system 110, the powder delivery system 120, the light sources 130 and the optical head motion system 142 in coordination to form the build layers of the three-dimensional structure. The control system 150 may control the powder bed support system 110, for example, by controlling a stepper motor driving the piston in the powder bed support system 110 to lower the powder bed 102 according to a defined increment after forming each new build layer. The control system 150 may thus control the thickness of each of the powder layers and thus each of the build layers. The control system 150 may control the powder delivery system 120, for example, by controlling a drive motor driving the powder spreader 122 to spread each new layer of power material 104 over the powder bed 102 after lowering the powder bed 102. The control system 150 may automatically cause a re-layering of the powder after each build layer by lowering the powder bed 102 by the defined layer thickness and driving the powder spreader 122 to spread a new layer of powder 104 on the powder bed 102.

The control system 150 may also control the array of light sources 130, for example, by controlling which light source is activated or turned on, by controlling an output power, and by controlling the duration of the emitted light (and thus the exposure time). The control system 150 may further control the movement and orientation of the optical head 140, for example, by controlling the X-Y motors driving the optical head motion system 142 to position the optical head 140 according to a scanning pattern or strategy. The control system 150 may thus cause light to be generated selectively from the light sources 130 and selectively directed to different locations on the powder bed 102 from the optical head 140 with each exposure.

The control system 150 may receive build instructions 152 defining each of the build layers of a three-dimensional structure and the operation of the bed support system 110, the powder delivery system 120, the light sources 130 and the optical head motion system 142 to form those build layers. The build instructions 152 may include, for example, image slice data, scanning data, layer thickness data, scan strip overlap data, and energy distribution data. This data may be variable and may be defined when the build instructions are generated. The image slice data defines a series of binary images corresponding to planar slices through a model of the three-dimensional structure and corresponding to each of the build layers forming the three-dimensional structure. The scanning data defines a scan pattern or strategy such as a pattern of movement of the optical head 140 relative to the powder bed 102 such that the multiple beams are capable of selectively exposing any location on the exposed layer of the powder bed 102. The strip overlap data defines an amount of overlap between adjacent scan strips on the powder bed 102. The layer thickness data defines a thickness of each layer of powder material and thus each build layer. The energy distribution data defines the energy distribution of the light on the powder including power and exposure time for each of the selected light sources.

The build instructions 152 may be in the form of a file or other data structure. The build instructions 152 may be produced from a model of an object, for example, as represented by a CAD file. Each line of the build instructions 152 may include a position of the optical head 140, an identification of the light source(s) to be activated at that position, and the exposure time and power for each of the identified light source(s) to be activated at that position. The build instructions 152 may thus provide the data to form multiple voxels at each position of the optical head 140 such that multiple positions of the optical head 140 produce all of the voxels in each build layer. The build instructions 152 may also include re-layer instructions to initiate a re-layering after each build layer is formed.

The control system 150 may include a CNC computer (e.g., a PC) and/or microcontroller circuitry. In one example, the CNC computer may read a build instruction file line by line to obtain the position data and control the position of the optical head 140. The CNC computer may send instructions to a microcontroller for controlling the light sources 130 while the optical head 140 is in each position. The CNC computer may also send instructions to the powder bed support system 110 and the powder delivery system 120 for controlling the positions of the piston stepper motors and powder spreader motor in the processing chamber to re-layer the power. In one example of operation, the microcontroller may send a busy signal to the CNC computer to halt reading instructions while re-layering and may send a ready signal after re-layering is complete. In another example, the microcontroller may receive build instructions directly and may have sufficient processing power to allow for autonomous operation without the CNC computer.

Referring to FIG. 2, one embodiment of a multiple beam optical head 240 includes a one-dimensional array (i.e., a single line) of n optical fiber output ends 234-1 to 234-n at the end of an array of optical fibers 232-1 to 232-n coupled to respective light sources 230-1 to 230-n (e.g., lasers). The one-dimensional multiple beam optical head 240 is thus capable of producing up to n light beams 231-1 to 231-n in a one-dimensional array. The number and the pattern of the light beams 231-1 to 231-n produced in the one-dimensional array may be changed by selectively activating the light sources 230-1- to 230-n.

The one-dimensional multiple beam optical head 240 may include a fiber positioning block 242 that positions and spaces the optical fiber output ends 234-1 to 234-n. The optical head 240 may also include optics such as one or more imaging optics 244 that focus and direct focused beams 231-1 to 231-n to the processing surface 206 such that adjacent focused beams 231-1 to 231-n are spaced at the processing surface 206. The imaging optics 244 may include a single lens focusing all of the beams or multiple lenses (e.g., a microlens array) focusing the respective beams. Thus, the beam spots produced by the beams 231-1 to 231-*n* on the powder layer at the processing surface have a spacing that results in melt pools and fused regions that are spaced accordingly. Although the output ends are shown with a substantially equal spacing, the optical head 240 may also provide an unequal spacing.

The optical fiber output ends 234-1 to 234-*n* may be tight packed in the block 242, for example, 10 fibers having a diameter of 100 µm may be tight packed within 1 mm. The beam spot size and spacing is generally a function of the fiber core diameter, the fiber spacing, and the focus of the beam. In some embodiments, the imaging optics 244 may focus the beams 231-1 to 231-*n* such that the focused adjacent beams 231-1 to 231-*n* have a beam spot size in a range of 50 µm to 300 µm and a spacing in a range of about 150 µm to 600 µm at the processing surface 206. In another example, single mode lasers may be used to obtain spot sizes as low as 20 microns. In a further example, multimode fibers with a core in the range of 100 to 110 microns may produce an imaged spot size of 100 to 110 microns. When the fibers are tight packed, the center to center spacing of the beams may correspond generally to the fiber diameter, for example, 10 micron fibers tight packed may provide a 10 micron spacing center to center and 100-110 micron multimode fibers tight packed may provide roughly 100 to 110 micron spacing. As will be discussed in greater detail below, the beam spot size and spacing may be adjusted by adjusting the focus relative to the processing surface.

When used in a multiple beam additive manufacturing system and method, as described herein, the one-dimensional multiple beam optical head 240 may be moved to different positions (e.g., in a linear or non-linear scan pattern) while selectively activating one or more of the light sources 230-1 to 230-*n*. At each position of the optical head 240, for example, one or more of the light sources 230-1 to 230-*n* is turned on for a defined time and power (e.g., as defined by the build instructions) to produce one or more beams 231-1 to 231-*n* and an exposure pattern including one or more beam spots on the processing surface 206. When used to form a build layer in a powder bed, for example, one or more of the light sources 230-1 to 230-*n* are selectively activated (i.e., modulated) to produce a pattern of light beams 231-1 to 231-*n* that will melt and fuse regions of a powder layer corresponding to the voxels of the build layer.

As shown in FIG. 2A, the multiple beam optical head 240 and/or the imaging optics 244 may be moved to different positions to change the focus of the beams 231 relative to the processing surface 206*a-c*. Changing the focus of the beams 231 changes the mark-to-space ratio and thus changes the spot size, the spacing, and the power density of the beam spots. FIG. 2A illustrates three different degrees of focus and the beam spots 233*a-c* produced at the respective processing surfaces 206*a-c*. When the beams are in focus on the processing surface 206*a* (i.e., the processing surface 206*a* is in the focal plane), the beam spots 233*a* may have a minimized spot size and maximized power density but the spacing is larger. When the beams are defocused relative to the processing surface 206*b*, 206*c* (i.e., the processing surface is out of the focal plane), the beam spots 233*b*, 233*c* may have a larger spot size and lower power density and a smaller spacing. Thus, the multiple beam optical head 240 may adjust the focus to provide overlapping beam spots for certain applications that do not require the higher power density and resolution. The beam spot size may be varied, for example, for different materials and/or for different regions of a build layer as described in greater detail below.

Thus, a spacing between beams spots in a distributed exposure pattern may be provided by focusing the beams on the processing surface and the spacing may be adjusted by changing the focus. A spacing between beams spots in a distributed exposure pattern may also be provided by using non-adjacent beams in the multiple beam distributed exposure. If the beams are defocused, for example, such that adjacent beam spots are not spaced (e.g., the beam spots 233*c* in FIG. 2A), the light sources may be selectively activated such that the exposures do not use adjacent beams.

Referring to FIG. 3, another embodiment of a multiple beam optical head 340 includes a two-dimensional array of n×m optical fiber output ends 334-1 to 334-*n*, 334-*m*. The two-dimensional array generally includes two or more columns n of optical fiber output ends 334-1 to 334-*n* and two or more rows m of optical fiber output ends 334-1 to 334-*m*. The optical fiber output ends 334 in each row and column may be aligned as shown or may be staggered to create an exposure pattern with staggered beam spots. Although the two-dimensional array is shown as a rectangular array, the two-dimensional array may have other shapes and configurations.

Similar to the one-dimensional multiple beam optical head 240, the optical fiber output ends 334-1 to 334-*n*, 334-*m* are located at the ends of optical fibers coupled to respective light sources (not shown in FIG. 3). The two-dimensional multiple beam optical head 340 is thus capable of producing up to n×m light beams 331-1 to 331-*n*, 331-*m* in a two-dimensional array. The number and the pattern of the light beams 331-1 to 331-*n*, 331-*m* produced in the two-dimensional array may be changed by selectively activating the light sources.

The two-dimensional multiple beam optical head 340 includes a fiber positioning block 342 that positions and spaces the optical fiber output ends 334-1 to 334-*n*, 334-*m*. The two-dimensional multiple beam optical head 340 also includes optics such as imaging optics 344 for focusing the multiple beams 331 toward the processing surface 306 to form an array of spaced beam spots. The spacing of the adjacent focused beams 331-1 to 331-*n*, 331-*m* produced by the two-dimensional multiple beam optical head 340 may be within the same range of the one-dimensional multiple beam optical head 240 described above. The two-dimensional multiple beam optical head 340 and/or imaging optics 344 may also be adjusted to adjust the focus and the beam spot size and spacing as described above.

When used in a multiple beam additive machining system and method, as described herein, the two-dimensional multiple beam optical head 340 may be moved to different positions (e.g., in a linear or non-linear scan pattern) while selectively activating one or more of the light sources. At each position of the optical head 340, for example, one or more of the light sources may be turned on for a defined time and power (e.g., as defined by the build instructions) to produce one or more beams 331-1 to 331-*n*, 331-*m* and an exposure pattern including beam spots on the processing surface 306. When used to form a build layer in a powder bed, for example, one or more of the light sources are selectively activated to produce a pattern of light beams 331 that will melt and fuse regions of a powder layer corresponding to voxels of the build layer.

In an embodiment, the two-dimensional multiple beam optical head 340 provides a two-dimensional array of beams that is smaller than the surface area of a powder layer on the powder bed. In this embodiment, the two-dimensional multiple beam optical head 340 is thus moved or scanned across the powder layer to provide exposures across the entire powder layer. In another embodiment, the two-dimensional multiple beam optical head 340 may provide a two-dimensional array large enough to cover substantially the entire surface area of a powder layer on the powder bed. In this embodiment, the two-dimensional multiple beam optical head 340 is capable of exposing an entire surface area of the powder layer with only a small number of local movements depending on the spacing of the beam spots.

In another embodiment, a multiple beam optical head may be modular and configurable to create the different arrays (e.g., one or two dimensional) of different dimensions. The fiber positioning blocks that hold and position the optical fiber output ends, for example, may be configured to be connected together. Thus, multiple one-dimensional arrays of optical fiber output ends may be connected together to form a larger one-dimensional array or a two-dimensional array, or multiple two-dimensional arrays of optical fiber output ends may be connected together to form a larger two-dimensional array.

Although embodiments described herein refer to optical fibers with circular cross sections producing circular beam spots, a multiple beam additive manufacturing system and method may also use optical fibers with other cross sections such as square. Additional optics may also be used to modify the shape of the beam spot. Although the illustrated embodiments show the optical heads directing the beams orthogonally toward the processing surface, the optical head may also be tilted to direct the beams at an angle relative to the processing surface.

FIGS. 4A-4D illustrate an example of the formation of build layers of a three-dimensional structure 401 using a multiple beam optical head 440, consistent with embodiments of the present disclosure. Although this example shows a one-dimensional multiple beam optical head 440, a two-dimensional multiple beam optical head may also be used in the same manner. In this example, the three dimensional structure 401 has side sections 403a, 403b and a top section 405 and is formed by a series of build layers 408-1 to 408-7 that together form the side sections 403a, 403b and the top section 405. Each of the build layers 408-1 to 408-7 is made up of voxels and each of the voxels is formed when powder fuses as a result of an exposure by one or more of the beams 431 emitted from the multiple beam optical head 440.

As shown, successive powder layers 402-1 to 402-7 are deposited on the powder bed 402 and the multiple beam optical head 440 is moved to different locations relative to the powder layers 402-1 to 402-7 to expose each of the powder layers in selected regions with one or more of the beams 431 to form the voxels that make up each of the build layers. In particular, the exposures from the beams 231 melt at least a portion of the powder within the exposed region (i.e., the beam spot) and through the powder layer to form respective fused regions 406 that correspond to respective voxels in the build layer 408. The energy from each of the exposures by the beams 431 penetrates the powder layer sufficiently for the fused regions 406 to extend to and join with any fused region or voxel at the same location in a previous build layer. For example, the voxel or fused region 406a shown in FIG. 4A is joined with a corresponding voxel in the previous build layer 408-1. The thickness of the powder layer thus determines the depth of each voxel and the build resolution. For some structures or for some portions of a structure, a thicker layer of powder material may be used with a higher output power of the light.

As shown, the optical head 440 may perform multiple beam distributed exposures using the beams 431 to form corresponding distributed melt pools and distributed fused regions 406. By moving the optical head 440 according to a scan pattern and providing the multiple beam distributed exposures at a plurality of different positions of the optical head 440, the distributed fused regions 406 may be joined together to form the build layer. In other words, subsequent multiple beam distributed exposures fill in the spaces between the distributed fused regions 406. Forming distributed melt pools and fused regions allows multiple beams to be used to increase build speeds while also de-localizing the thermal energy to reduce the thermal part stress. Joining the fused regions or voxels at a later time allows the thermal stresses to disperse. Various scan patterns and strategies may be used to join the distributed fused regions 406 in a build layer, as will be described in greater detail below. The fused regions 406 are shown as rectangular shaped for illustrative purposes only and may have other shapes such as a cylindrical or spheroid shape.

FIGS. 4A and 4B show the formation of the side sections 403a, 403b of the structure 401 in the build layer 408-2 by using multiple beams 431 to perform distributed exposures on the powder layer 402-2 along relatively narrow strips corresponding to the side sections 403a, 403b. FIGS. 4C and 4D show the formation of the top section 405 of the structure 401 in the build layers 408-5, 408-7 by using multiple beams 431 to perform distributed exposures across the respective powder layers 402-5, 402-7 over a larger area corresponding to the top section 405.

Figure 5A:
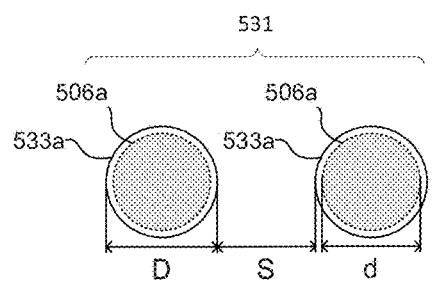
FIG. 5A is a schematic diagram of beam spots and melt balls resulting from a multiple beam distributed exposure, consistent with embodiments of the present disclosure.

As shown in FIG. 5A, a multiple beam distributed exposure 531 provides a distributed exposure pattern including a plurality of spaced beam spots 533a, 533b having a beam spot size D and a spacing S. Each of the beam spots 533a, 533b produces a corresponding melt ball 506a, 506b (and fused region). When the beam has a Gaussian intensity profile, the lower energy at the outside regions of the beam may result in the melt ball 506a, 506b having a smaller size than the beam spots (e.g., a smaller diameter d). To join the fused regions, therefore, a plurality of multiple beam distributed exposures are overlayed such that the melt balls overlap to fill the spaces between the melt balls 506a, 506b formed by the distributed exposure 531.

Figure 5B:
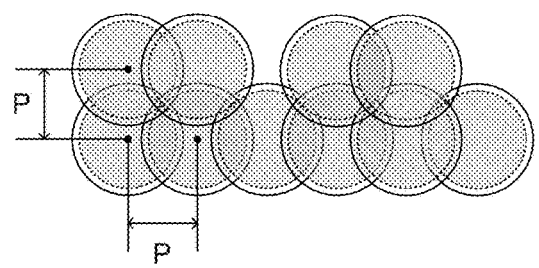
FIG. 5B is a schematic diagram of beam spots and melt balls resulting from overlapping multiple beam distributed exposures, consistent with embodiments of the present disclosure.

As shown in FIG. 5B, the spaces between the melt balls 506a, 506b may be filled by using a plurality of multiple beam distributed exposures overlayed on a grid having a grid pitch P. This allows distributed fused regions to be joined together by subsequent distributed exposures. In this example, the grid pitch P and spacing S is such that two melt balls are placed within the space between the melt balls 506a, 506b formed by the multiple beam distributed exposure 531 using two beam spots from two subsequent exposures. This is not a limitation of the present disclosure, however, because the pitch P, spacing S, beam size D, melt ball size d, and number of melt balls filling the space may vary. FIG. 5B shows an overlap that is sufficient to minimize any interstitial air between the melt balls; however, the overlap may be greater or less than the overlap shown in FIG. 5B.

Figure 6:
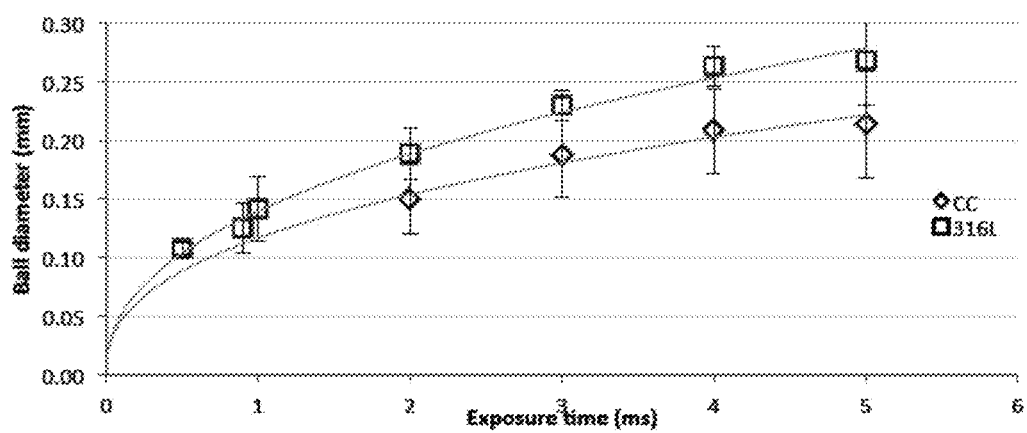
FIG. 6 is a graph of melt ball diameter as a function of exposure time for a laser beam exposing powder layers of stainless steel and cobalt chrome, respectively, using a multiple beam additive manufacturing method, consistent with embodiments of the present disclosure.

The size of the melt pool or melt ball 506a, 506b may depend on the type of powder material, the power of the light beam, the size of the beam spot, and the exposure time. FIG. 6 illustrates melt ball diameter as a function of exposure time for stainless steel 316L and cobalt chrome. In this example, the light source is a diode laser with a power of 30 W and a wavelength of 974 nm and the beam is focused to a spot size of about 300 microns. As shown, stainless steel 316L, despite having a higher melt temperature, forms larger melt balls than cobalt chrome for a given exposure time. Thus, absorption and specific heat should be taken into consideration when characterizing the melt ball creation process for a particular powder material.

Various scan patterns may be used to overlay the multiple beam distributed exposures on a grid as described above. FIGS. 7A-7E illustrate several interleaved scan patterns (or scan strategies) using a distributed exposure pattern 733 including a one-dimensional array of three spaced beam spots. This distributed exposure pattern 733 may be produced, for example, by one-dimensional array of at least three optical fibers. Distributed exposure patterns with other numbers of beam spots may be produced with other numbers of optical fibers.

This distributed exposure pattern 733 produces a corresponding melt pattern of three spaced melt balls, which results in a corresponding pattern of three spaced fused regions or voxels. Subsequent multiple beam distributed exposures may be made using this same distributed exposure pattern 733 to join together the corresponding distributed fused regions within a scan region 735. Because the size of the melt ball may be smaller than the size of the corresponding beam spot that produces the melt pool, as discussed above, the beam spots in the subsequent multiple beam distributed exposures may overlap accordingly. It may also be possible to produce a melt pool or melt ball that is larger than the beam spot, for example, by increasing the power and/or exposure time.

Figures 7A, 7B, 7C, 7D, 7E:
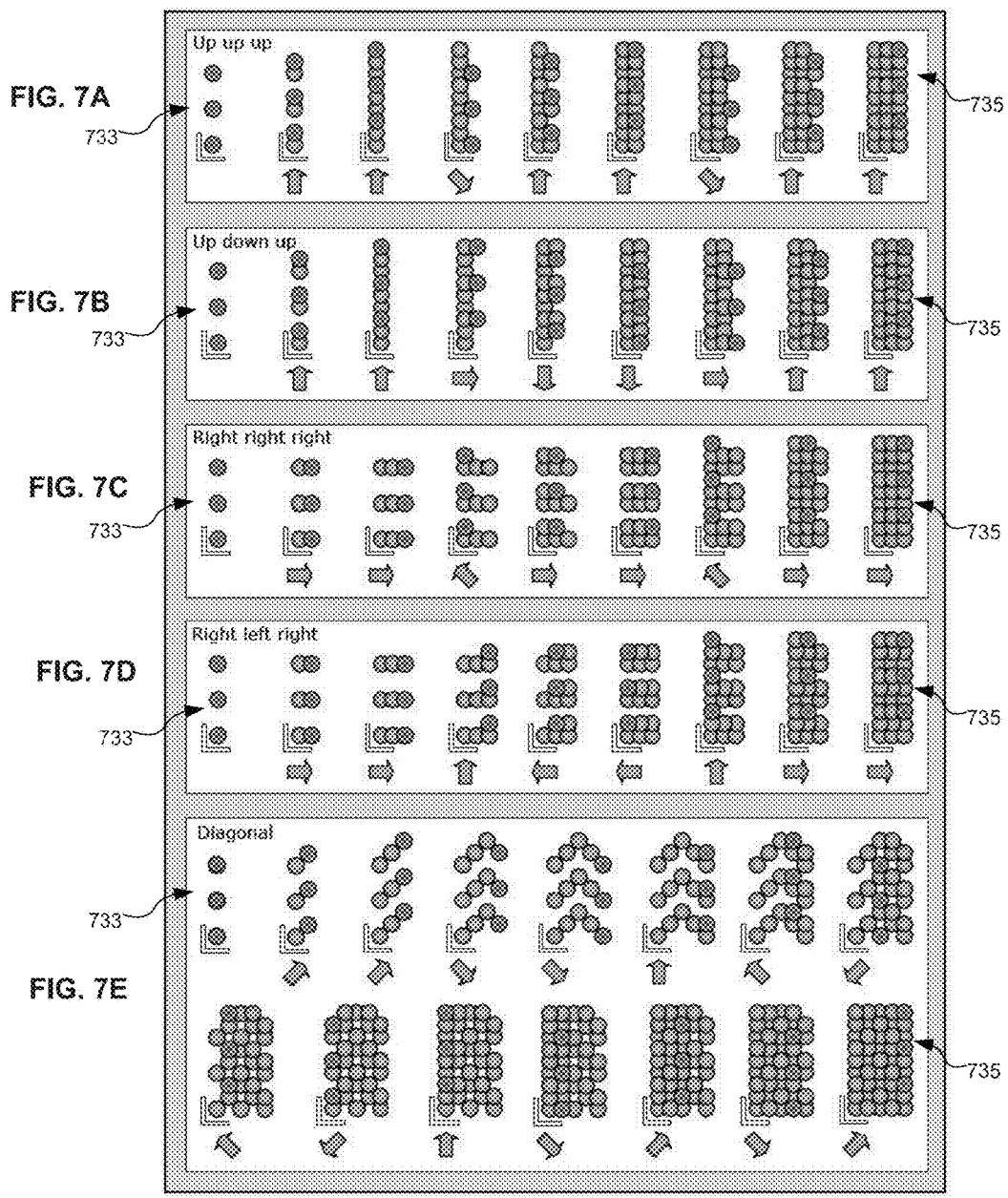
FIGS. 7A-7E illustrate different scan patterns for one-dimensional multiple beam distributed exposures, consistent with embodiments of the present disclosure.

As illustrated in FIGS. 7A-7E, each scan pattern includes a series of local movements by the optical head in different axes, thereby interleaving the exposure pattern 733 to fill the spaces between the beam spots and cover a scan region 735, which corresponds to a section of a build layer. The grid size of the scan region 735 may be a function of the number of beam spots in the exposure pattern 733, the spacing between the beam spots, and the movements in the scan pattern. In this example with three beam spots and three exposures to fill the spaces, the scan regions 735 are formed with nine (9) overlapping beam spots along the length. In particular, FIGS. 7A-7D show scan regions 735 with a 3×9 grid size and FIG. 7E shows a scan region 735 with a 5×9 grid size.

The arrows in FIGS. 7A-7E indicate the direction of each local movement of the optical head in the X and Y axes to each local position for producing each subsequent multiple beam distributed exposure until the scan region is covered. If all of the beams are exposed at each of these positions, a solid build layer section is formed within the scan region 735 by the melt balls corresponding to the beam spots. By selectively activating the light sources and selectively producing the beam spots in each of the different positions, a build layer section with a different pattern or shape may be formed in the scan regions 735. These local movements may be repeated at a series of locations such that multiple scan regions 735 form a scan strip across a powder bed. Multiple scan strips may be overlapped (e.g., with a defined scan strip overlap) as needed to cover an entire powder layer and form a complete build layer.

Figure 7F:
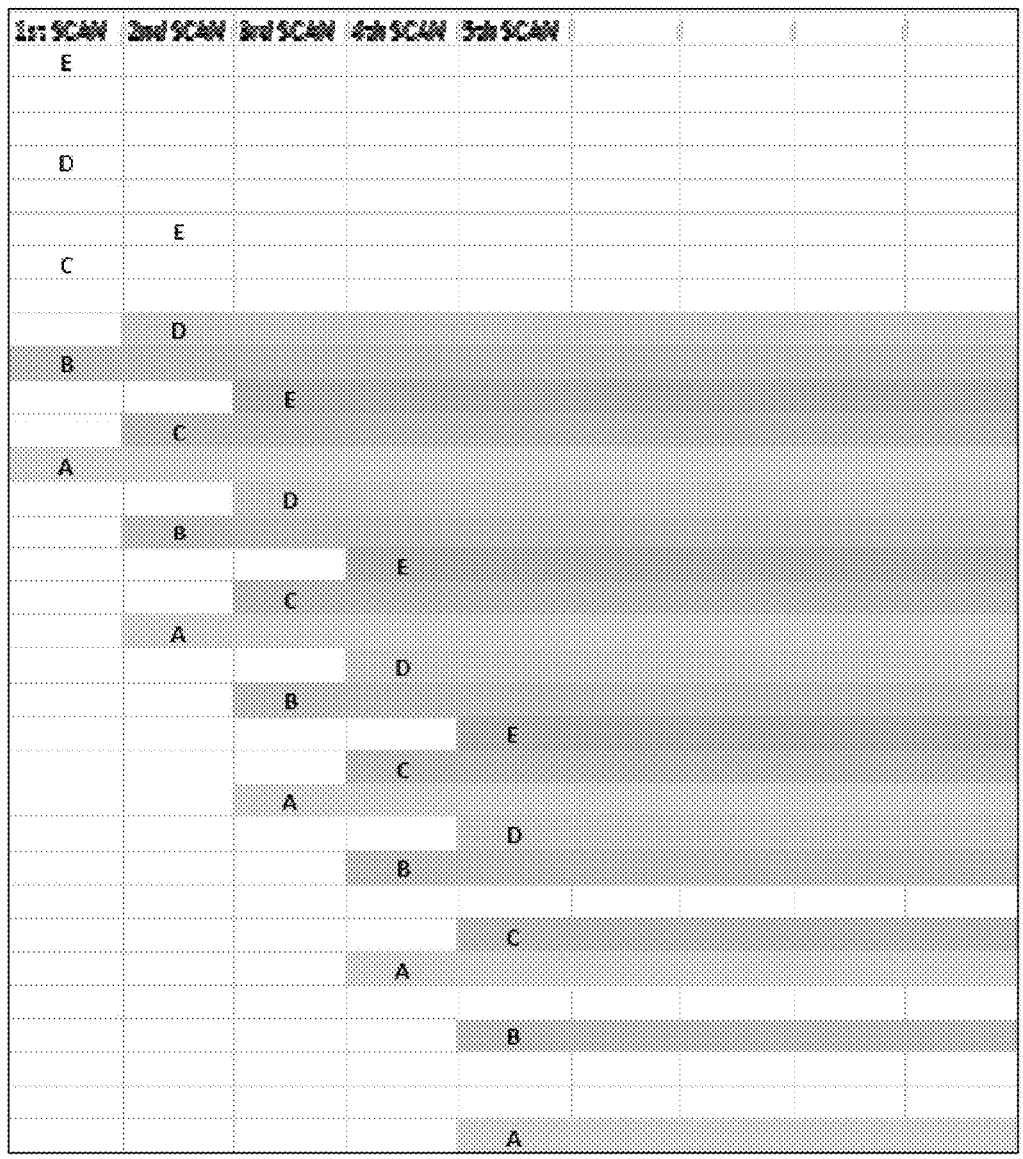
FIG. 7F illustrates a scan pattern formed by interleaving scan lines, consistent with another embodiment of the present disclosure.

FIG. 7F illustrates a further example of interleaving in a 5 beam system. In this example, each letter represents a different beam and each column represents a successive scan. The powder material may be fused and filled in one scan line at a time without neighboring scan lines being imaged together at the same time. In other words, the interleaving technique is used with multiple beams that are not adjacent or contiguous to fill in between the scan lines.

Interleaving may provide several benefits in additive manufacturing. In particular, interleaving allows the imaging process to proceed as a smooth motion in the slow scan direction. If a contiguous array of beam spots is used, they would be imaged in a block and the slow scan direction would step forward by the size of the array. By interleaving single beam spots in a non-contiguous array, the array may be stepped in the slow scan direction in smaller steps.

Interleaving non-contiguous scan lines also allows each scan line to be imaged with consistent characteristics. Because adjacent scan lines are not be imaged at the same time, the base material in the adjacent areas is not being fused and thus is cold. Laser additive manufacturing with a metal powder is a thermal process on a thermally conductive material. If a contiguous array is used, the center of the array is much hotter than the edge of the array resulting in different imaging characteristics in the center than at the edges. The fused material at the edges will thus have different properties, for example, resulting in visible stripes. The structure of the fused material is improved when adjacent beams are not affecting the temperature. When interleaving the scan lines, therefore, the temperature is more consistent across the beam spot array and across the scan lines formed by the array.

FIGS. 8A and 8B illustrate interleaved scan patterns (or scan strategies) using a two-dimensional distributed exposure pattern 833 to cover a scan region 835. The two-dimensional distributed exposure pattern 833 may be scanned according to any of the interleaved scan patterns shown in FIGS. 7A-7E.

FIG. 9 illustrates a linear scan pattern using an angled one-dimensional distributed exposure pattern 933. In this example, the angled one-dimensional distributed exposure pattern 933 is angled relative to the linear scan direction such that a beam spot will be overlapped by an adjacent beam spot in a subsequent exposure. As such, the angled one-dimensional distributed exposure pattern 933 may be scanned along one axis and does not require movement in the other axis to fill the spaces between the beam spots.

FIG. 10 illustrates a linear scan pattern using a staggered two-dimensional distributed exposure pattern 1033. In this example, the beam spots are staggered such that a beam spot will be overlapped by an adjacent beam spot in a subsequent exposure. As such, the staggered two-dimensional distributed exposure pattern 1033 may be scanned along one axis and does not require movement in the other axis to fill the spaces between the beam spots.

Figure 11:
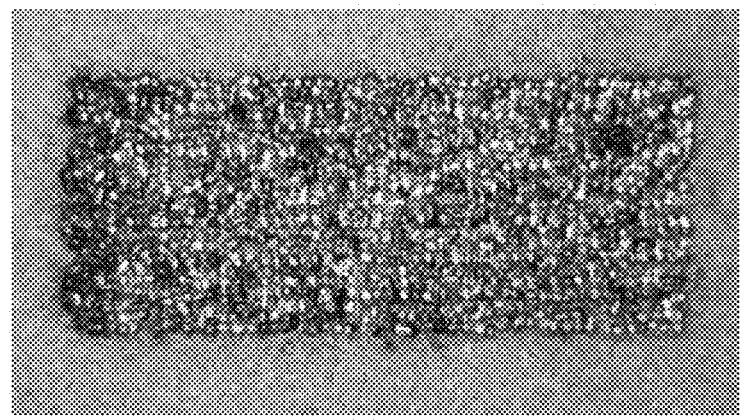
FIG. 11 is a photograph of a single layer solid structure formed using multiple beam additive manufacturing, consistent with an embodiment of the present disclosure.
Figure 12:
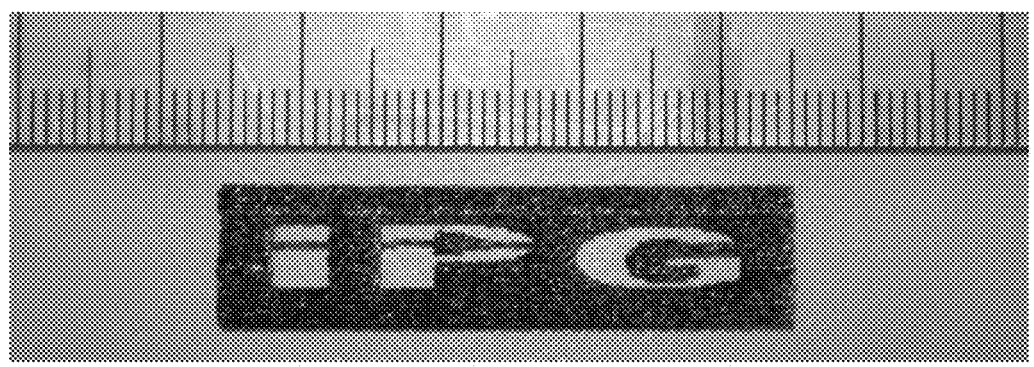
FIG. 12 is a photograph of a single layer shaped structure formed using multiple beam additive manufacturing, consistent with an embodiment of the present disclosure.
Figure 13:
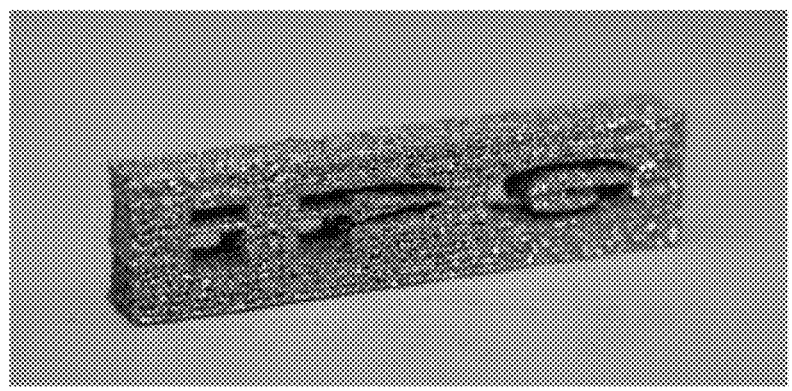
FIG. 13 is a photograph of a multiple layer shaped structure formed using multiple beam additive manufacturing, consistent with an embodiment of the present disclosure.

FIGS. 11-13 show structures that were built using one embodiment of a multiple beam additive manufacturing system and method. Each of these objects were built from stainless steel 316L powder having a particle size of greater than 5 μm and smaller than 53 μm. The system included seven diode lasers having a wavelength of about 974 nm and a power of about 30 W coupled to seven optical fibers arranged in a one-dimensional array and closely packed in the optical head.

FIG. 11 shows a single layer solid rectangular structure including 50 by 21 melt balls (or voxels). This single layer solid rectangular structure was built using the scanning strategy shown in FIG. 7A and exposure times of about 5 ms for each diode laser. FIG. 12 shows a single layer 261×64 voxel structure forming the lettering of the "IPG" logo. This structure was built on a grid of pitch 0.15 mm with a two pixel overlap between scan strips and an exposure time of 5 ms for each voxel. FIG. 13 shows a multiple layer structure forming the lettering of the "IPG" logo. This multiple layer structure was built using ten build layers on a grid pitch of 0.15 mm with a two pixel overlap between scan strips and an exposure time of 10 ms per voxel. An anchor pillar (not shown) was used at each corner of the multiple layer structure to affix the build to a substrate to prevent cumulative stress from distorting the structure. The use of a vacuum system to remove residual oxygen and back fill with an inert gas may reduce oxidization and improve inter-layer consolidation in a multiple layer build. Oxidization may also be reduced where re-melting occurs, for example, at the stitching overlap.

Another embodiment of a multiple beam additive manufacturing system and method may be used to provide different resolutions, for example, by using different beam spot sizes. Smaller beam spot sizes generally produce smaller melt balls/fused regions/voxels and thus higher resolutions. Larger beam spot sizes generally produce larger melt balls/fused regions/voxels and thus lower resolutions. The beam spot size may be controlled, for example, by adjusting the focus as described above. Different light sources or lasers may also be used to provide different beam spot sizes and resolutions. This embodiment may use a single larger beam and a single smaller beam and/or may use multiple larger beams and multiple smaller beams.

In one example, a larger beam spot size may be in a range of 400-500 μm and a smaller beam spot size may be in a range of 50-70 μm. The larger spot may be used to fuse the bulk of the material and the smaller spot may then be used to perform fine details and/or edge finishing. In this embodiment, a large multi kW laser may be used at a higher output power (e.g., 500 W-5 kW) for the larger spots and at a lower output power (e.g., 100-400 W) for the smaller spots.

Figure 14:
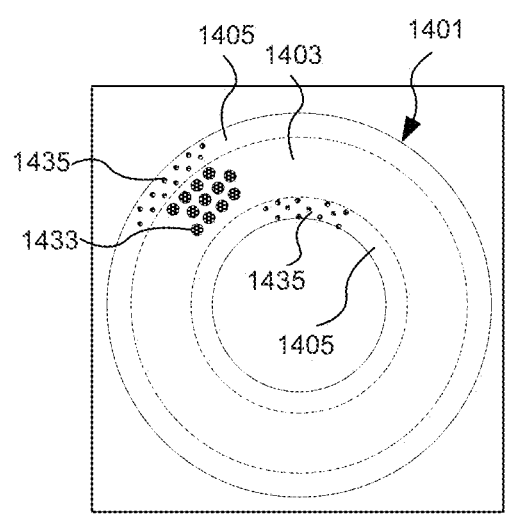
FIG. 14 is a top view of a build layer illustrating different resolutions in different regions of the build layer, consistent with an embodiment of the present disclosure.

As shown in FIG. 14, for example, the larger sized beam spots 1433 may be used in the interior regions 1403 of the structure 1401 and the smaller sized beam spots 1435 may be used on the outer regions 1405 of the structure 1401 where higher resolutions are desired. Using larger beam spot sizes and lower resolutions on a substantial portion of the structure 1401 enables faster build rates. Using smaller beam spots 1435 and higher energy density proximate the edges provides a smother surface finish on the outer surface of the structure 1401 when built.

Figure 15A:
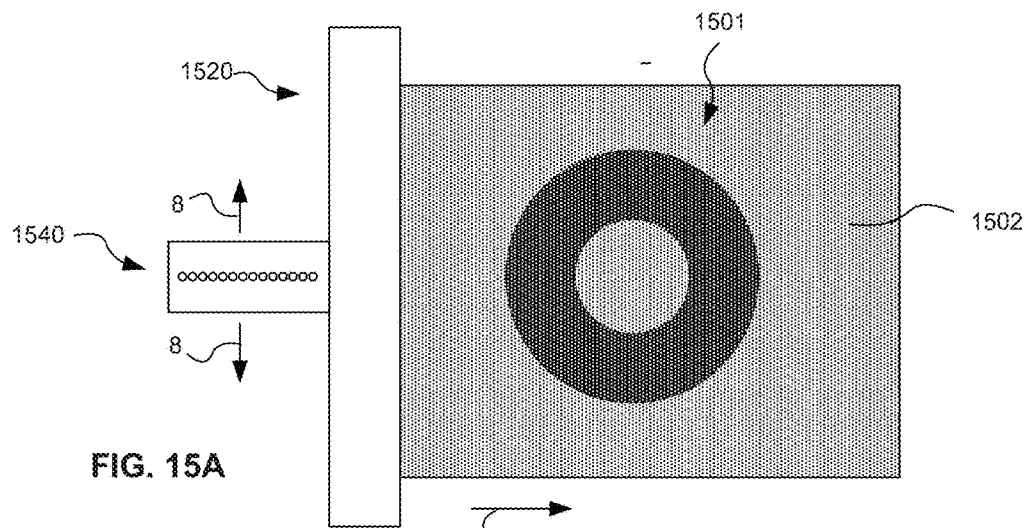
FIGS. 15A-15C are top schematic views of a multiple beam optical head coupled to a powder delivery system for exposing a powder layer as the powder layer is delivered, consistent with a further embodiment of the present disclosure.
Figure 15B:
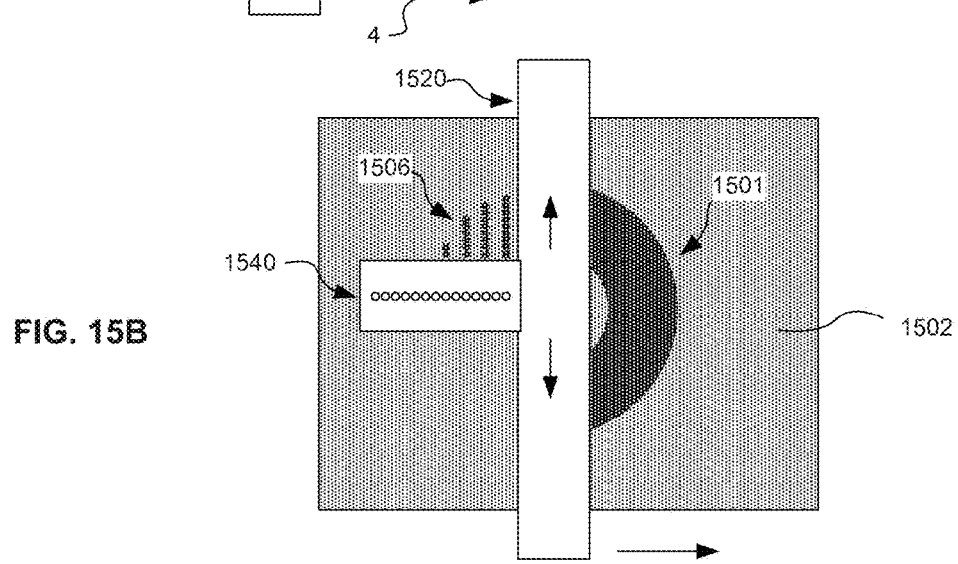
Figure 15C:
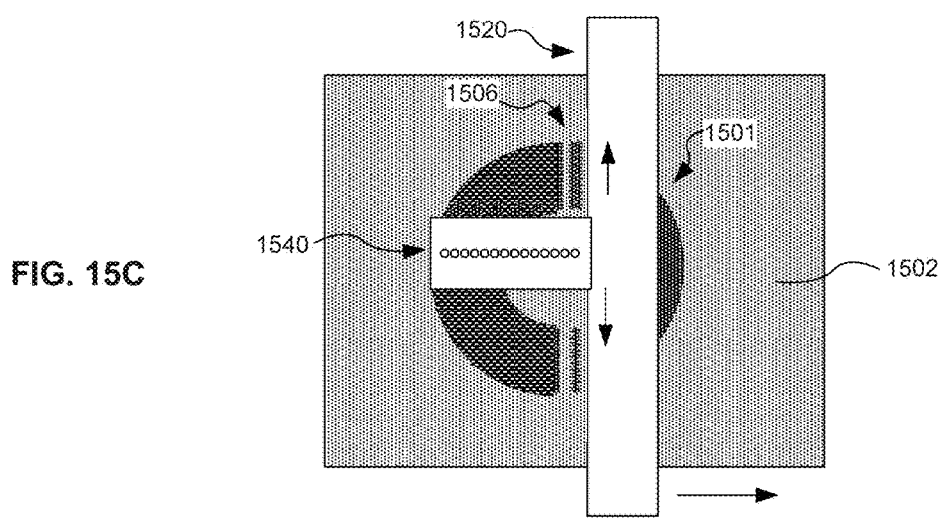

In a further embodiment, as shown in FIGS. 15A-15C, a multiple beam additive manufacturing system includes a multiple beam optical head 1540 that follows the delivery of each layer of powder such that the multiple beams scan the powder bed 1502 as each powder layer is delivered. The multiple beam optical head 1540 may be coupled, for example, to the powder spreader apparatus 1520 that moves across the powder bed. As the powder spreader apparatus 1520 moves in a linear direction across the powder bed 1502, as indicated by arrow 4, to spread the powder layer, for example, the multiple beam optical head 1540 scans back and forth in an orthogonal direction, as indicated by arrows 8, similar to a printer carriage.

At each position, the optical head 1540 may provide a multiple beam distributed exposure to form a pattern of distributed fused regions 1506 (FIG. 15B). The distributed fused regions 1506 are joined to form the build layer of the structure 1501 by performing subsequent distributed exposures as the spreader apparatus 1520 continues to move across the powder bed (FIG. 15C). Scanning and exposing the powder layer as the layer is delivered avoids having to wait for the entire powder layer to be delivered before starting the scanning and exposure process and thus may further increase build rates.

In another variation of this embodiment, shown in FIG. 16, a multiple beam optical head 1640 includes an angled one-dimensional array. This multiple beam optical head 1640 provides an angled distributed exposure pattern that may be scanned, for example, as shown in FIG. 9, as a powder spreader apparatus 1620 moves across a powder bed 1602. In yet another variation, shown in FIG. 17, a multiple beam optical head 1740 includes a staggered two-dimensional array. This multiple beam optical head 1740 provides a staggered, two-dimensional distributed exposure pattern that may be scanned, for example, as shown in FIG. 10, as a powder spreader apparatus 1720 moves across a powder bed 1702. The angle of the exposure pattern may also be variable and controlled during the build process to control the spacing of the melt pools.

In a further embodiment, shown in FIG. 18, a multiple beam optical head 1840 is coupled directly to a powder delivery system. In this embodiment, the multiple beam optical head 1840 is mounted between powder delivery hoppers 1820a, 1820b and spreaders 1822a, 1822b. As the hoppers 1820a, 1820b move across the powder bed 1802 (e.g., in the direction of arrow 4), powder 1804 is released from the leading hopper 1820b and spread using the leading spreader 1822b. The multiple beam optical head 1840 scans back and forth across the powder bed in an orthogonal direction as described above and shown in FIGS. 15-17. A powder bed support platform 1810 lowers the powder bed 1802 after each build layer of the structure 1801 is formed.

Figure 19:
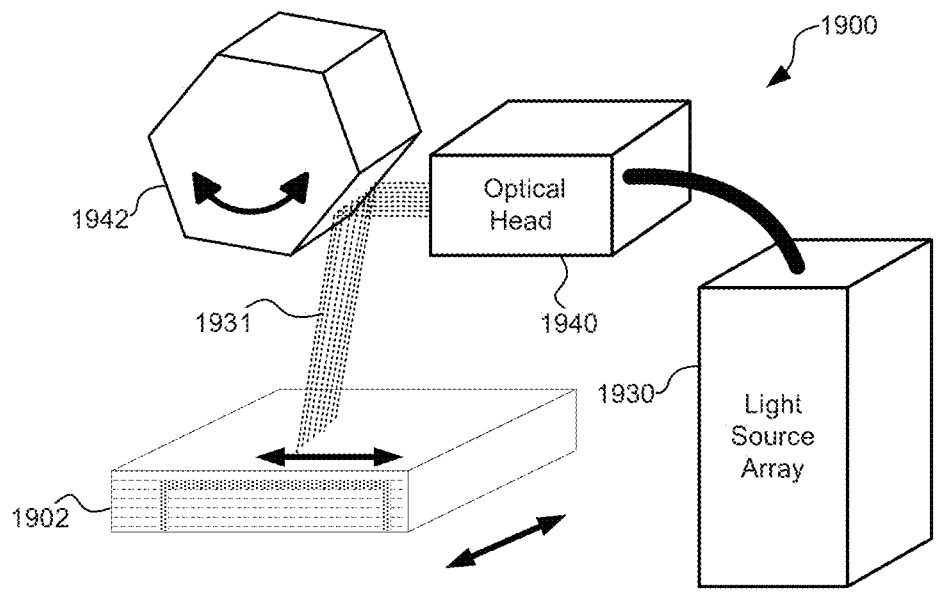
FIG. 19 is a schematic diagram of a multiple beam laser additive manufacturing system including a polygon mirror for scanning multiple beams, consistent with another embodiment of the present disclosure.

In another embodiment, shown in FIG. 19, a multiple beam additive manufacturing system 1900 may include a polygon mirror 1942 for scanning multiple beams 1931 according to any of the patterns described herein. An array of light sources 1930 selectively generates light that is directed by a multiple beam optical head 1940 to the polygon mirror 1942, which scans the beams 1931 across the powder bed 1902, for example, while performing distributed exposures. The polygon mirror may be capable of scanning the beams at speeds of 50 m/s. In this embodiment, the light beams 1931 may be scanned over the powder bed 1902 as the powder layer is being delivered (e.g., following the motion of a powder spreader). The powder bed 1902 may be moved in a direction orthogonal to the scanning direction to allow the multiple beams 1931 to be scanned across different regions of the powder bed 1902.

Figure 20:
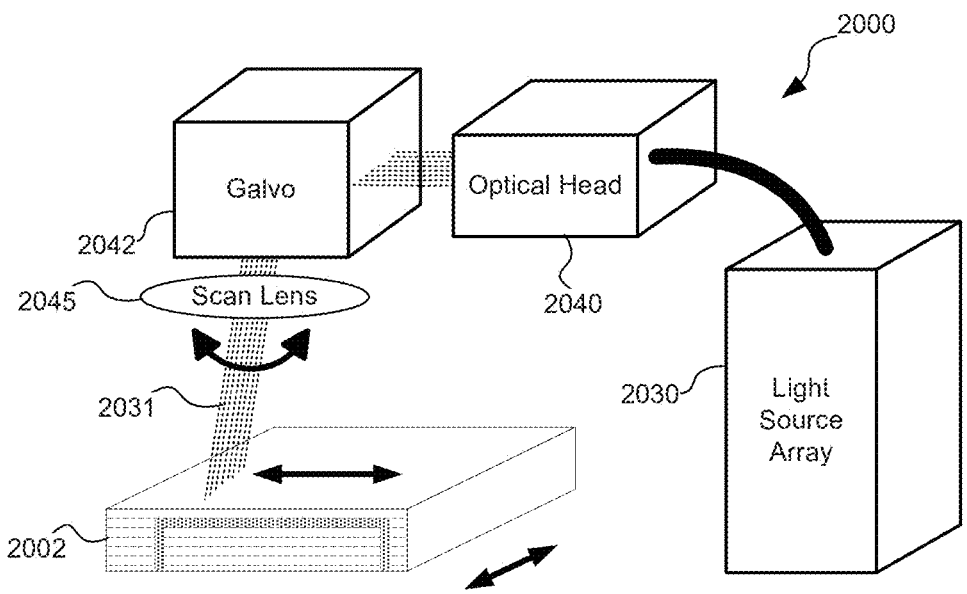
FIG. 20 is a schematic diagram of multiple beam laser additive manufacturing system including a galvo scanner for scanning multiple beams, consistent with another embodiment of the present disclosure.

In a further embodiment, shown in FIG. 20, a multiple beam additive manufacturing system 2000 may include a galvanometer scanner 2042 for scanning multiple beams 2031 according to any of the patterns described herein. The galvo scanner 2042 may include one or more scan mirrors for scanning in at least one direction. For larger parts, a second galvo scanner may be provided to scan in the perpendicular direction. For smaller parts, the galvo scanner 2042 may include a piezo mirror or a scan mirror driven by a voice coil to scan in the perpendicular direction.

An array of light sources 2030 selectively generates light that is directed by a multiple beam optical head 2040 to the galvo scanner 2042, which scans the beams 2031 across the powder bed 2002, for example, while performing distributed exposures. The optical head 2040 may provide substantially collimated beams to the galvo scanner and may include one or more zoom lenses (not shown) to vary the beam spot sizes. An F-theta scan lens 2045 to focus the beams 2031 on the powder bed 2002 when scanning.

In this embodiment, the light beams 2031 may be scanned over the powder bed 2002 as the powder layer is being delivered (e.g., following the motion of a powder spreader). The powder bed 2002 may also be moved to allow the multiple beams 2031 to be scanned across different regions of the powder bed 2002.

In an optical system that is radially symmetric, a multiple beam scanning system may be designed to scan an array of beams, as described above, with the array being arranged in different ways (e.g., different numbers of beams in different patterns or orientations). If a radially symmetric system is designed to accommodate an array of ±4 mm from the central axis, for example, it does not matter how many beams are generated within that 8 mm range or the orientation of those beams. In such a system, therefore, the array may be changed or reconfigured without changing the optics. For example, the array may be customized to the application (e.g., the material, the size of the part, etc.).

Multiple beam additive manufacturing systems and methods may reconfigure the beams in a two-dimensional array to allow different and more efficient scanning patterns. Multiple beam additive manufacturing systems and methods are not required to scan back and forth or up and down to form each build layer of a part. A multiple beam additive manufacturing system and method may scan a build layer by following the outline of the part (referred to as random access systems), which may be more efficient and allow faster build speeds. In such random access systems, the interleaving may be set up so that a two-dimensional array is used but only some of the beams are imaging, depending upon the orientation of the scan line. For a circular part, for example, instead of going back and forth and turning the beams on only when they cross the boundaries of a wall of the part (as shown, for example, in FIGS. 15A-15C), the array may be scanned around the circular shape. As the array moves around the circular shape, the array is oriented differently with respect to the direction of travel, so different sets of beams in the array would be turned on at different times accordingly. When interleaving as shown in FIG. 7F, for example, different sets of beams in the array may correspond to each of the interleaving beams A-E at different times.

Multiple beam additive manufacturing systems and methods with two-dimensional arrays may also use leading beams and trailing beams to pre-heat and post heat, respectively. Pre-heating and post-heating the material regulates the temperature profile to prevent the material from heating up and cooling down too fast.

In further embodiments, an array of beam spots for use in any of the methods described herein may be created using techniques other than an array of output ends of optical fibers coupled to an array of light sources. In one example, an array of light sources may be arranged over a processing surface to direct or focus light beams on the processing surface to form a one or two dimensional array of beam spots. In another example, a plurality of laser processing heads (e.g., such as the type used for laser welding) may be arranged over a processing surface to direct or focus light beams on the processing surface to form a one or two dimensional array of beam spots. In a further example, mirrors and/or other optical components may be used to direct light beams on a processing surface to form a one or two dimensional array of beam spots.

Accordingly, multiple beam additive manufacturing systems and methods, consistent with the present disclosure, may be used to improve the build speed for each of the build layers while reducing thermal part stresses.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for multiple beam additive manufacturing of a three-dimensional structure formed by a plurality of build layers, the method comprising:
   providing an array of light sources and an array of optical fibers coupled to the array of light sources, respectively, and an optical head including output ends of the optical fibers;
   delivering powder layers of powder material on a powder bed support system that moves vertically and incrementally to accommodate each of the powder layers; and
   forming build layers of the three-dimensional structure in each of the powder layers of powder material, wherein forming each of the build layers includes performing multiple beam distributed exposures on different regions of each powder layer to selectively fuse corresponding regions of the powder material, wherein performing each of the multiple beam distributed exposures includes simultaneously generating light from selected light sources in the array of light sources such that beams of light are emitted from the output ends of the optical fibers coupled to the selected light sources and directed to the corresponding regions of each powder layer to form a distributed exposure pattern including spaced beam spots and performing the multiple beam distributed exposures on each of the powder layers includes scanning the optical head with an interleaved scan pattern across the powder layer using the distributed exposure pattern, wherein the beams of light are directed with a power and duration sufficient to melt the powder material in the corresponding regions such that the powder material in the corresponding regions fuses to form fused regions, wherein the beam spots in each of the multiple beam distributed exposures are spaced sufficiently in a non-contiguous array to separate the fused regions formed by each of the multiple beam distributed exposures and are interleaved to fill spaces between the spaced beam spots, wherein each of the fused regions corresponds to a voxel of the three-dimensional structure and wherein the fused regions of the powder material in each of the powder layers collectively form each of the respective build layers of the three-dimensional structure.

2. The method for multiple beam additive manufacturing of claim 1 wherein the light sources include laser diodes.

3. The method for multiple beam additive manufacturing of claim 1 wherein the light sources include fiber lasers.

4. The method for multiple beam additive manufacturing of claim 1 wherein the output ends of the optical fibers are arranged in a one-dimensional array in the optical head.

5. The method for multiple beam additive manufacturing of claim 1 wherein the output ends of the optical fibers are arranged in a two-dimensional array in the optical head.

6. The method for multiple beam additive manufacturing of claim 1 wherein performing multiple beam distributed exposures on different regions of the powder layer includes moving the optical head relative to the powder layers to different locations for each of the multiple beam distributed exposures.

7. The method for multiple beam additive manufacturing of claim 6 wherein the optical head performs multiple beam distributed exposures on the powder layer as the powder layer is being delivered.

8. The method for multiple beam additive manufacturing of claim 1 wherein the output ends of the optical fibers are arranged in a two-dimensional staggered array such that a beam spot produced by one of the output ends overlaps a beam spot produced by an adjacent one of the output ends in a previous multiple beam distributed exposure.

9. The method for multiple beam additive manufacturing of claim 1 wherein the optical head is configured to produce beam spots having a size in a range of 50 to 300 µm and a spacing in a range of 150 to 600 µm.

10. The method for multiple beam additive manufacturing of claim 1 wherein performing the multiple beam distributed exposures includes scanning the beams of light using scanning optics.

11. The method for multiple beam additive manufacturing of claim 1 wherein the powder material includes a metal powder.

12. The method for multiple beam additive manufacturing of claim 11 wherein the metal powder includes particles having a particle size greater than 30 µm microns and particles having a particle size less than-5 µm.

13. The method for multiple beam additive manufacturing of claim 11 wherein the metal powder includes particles having a particle size greater than 50 µm.

14. The method for multiple beam additive manufacturing of claim 1 wherein the optical head includes imaging optics.

15. The method for multiple beam additive manufacturing of claim 14 further comprising controlling a size and spacing of the beam spots in the distributed exposure pattern by defocusing the beams relative to a processing surface.

16. The method for multiple beam additive manufacturing of claim 1 further comprising adjusting at least one of beam spot size and power to adjust a resolution of voxels at different regions of at least one of the build layers.

17. The method of claim 1 wherein the spaced beam spots in each of the multiple beam distributed exposures produce corresponding melt balls having a smaller size than the beam spots, and wherein the multiple beam distributed exposures are overlayed such that the melt balls overlap to fill the spaces between the melt balls formed by a previous one of the distributed exposures.

18. A method for multiple beam additive manufacturing of a three-dimensional structure formed by a plurality of build layers, the method comprising:
delivering a powder layer of powder material to a powder bed support system, wherein the powder material includes a metal powder and wherein the metal powder includes particles having asymmetric particle sizes including particles having a particle size greater than 30 µm microns and particles having a particle size less than 5 µm;
forming a build layer of the three-dimensional structure in the powder layer of powder material, wherein forming the build layer includes performing multiple beam distributed exposures on different regions of the powder layer to selectively fuse corresponding regions of the powder material in the powder layer, wherein performing each of the multiple beam distributed exposures includes simultaneously directing light beams to the corresponding regions of the powder layer to form a distributed exposure pattern including spaced beam spots, wherein the beams of light are directed with a power and duration sufficient to melt the powder material in the corresponding regions such that the powder material in the corresponding regions fuses to form fused regions, wherein the beam spots in each of the multiple beam distributed exposures are spaced sufficiently to separate the fused regions formed by each of the multiple beam distributed exposures, and wherein the fused regions of the powder material formed by the multiple beam distributed exposures collectively form the build layer; and
repeating the delivering a powder layer and the forming a build layer in the powder layer to form each of the build layers of the three-dimensional structure and wherein each of the fused regions corresponds to a voxel of the three-dimensional structure.

19. The method for multiple beam additive manufacturing of claim 18 wherein the beams of light form a one dimensional array of beam spots.

20. The method for multiple beam additive manufacturing of claim 18 wherein the beams of light form a two-dimensional array of beam spots.

21. The method for multiple beam additive manufacturing of claim 18 wherein the beam spots have a size in a range of 50 to 300 µm and a spacing in a range of 150 to 600 µm.

22. The method for multiple beam additive manufacturing of claim 18 wherein the metal powder includes particles having a particle size greater than 50 µm.

23. The method for multiple beam additive manufacturing of claim 18 further comprising adjusting at least one of beam spot size and power to adjust a resolution of voxels at different regions of at least one of the build layers.

24. The method of claim 18 wherein performing the multiple beam distributed exposures on each of the powder layers includes scanning the optical head with an interleaved scan pattern across the powder layer using the distributed exposure pattern, and the spaced beam spots are interleaved in a non-contiguous array to fill spaces between the spaced beam spots.

25. The method of claim 18 wherein the spaced beam spots in each of the multiple beam distributed exposures produce corresponding melt balls having a smaller size than the beam spots, and wherein the multiple beam distributed exposures are overlayed such that the melt balls overlap to fill the spaces between the melt balls formed by a previous one of the distributed exposures.

26. A method for multiple beam additive manufacturing of a three-dimensional structure, the method comprising:
providing an array of light sources and an array of optical fibers coupled to the array of light sources, respectively, and an optical head including output ends of the optical fibers;
receiving build instructions for each build layer of the three-dimensional structure, the build instructions including at least optical head positioning data defining a position of the optical head and light source data identifying selected light sources and a power and exposure time for the selected light sources; and
forming each build layer of the three-dimensional structure by moving the optical head relative to powder layers of powder material in accordance with the optical head positioning data while activating selected light sources in accordance with the light source data to provide multiple beam distributed exposures to corresponding selected regions of the layers of powder material to fuse the powder material in the corresponding selected regions, wherein the fused regions of the powder material in each of the layers form the build layers of the three-dimensional structure.

27. The method for multiple beam additive manufacturing of claim 26 wherein the optical head positioning data includes scan pattern data defining a scan pattern of the optical head.

28. The method of claim 27 wherein the scan pattern data defines an interleaved scan pattern across the powder layers such that spaced beam spots in the distributed exposures are interleaved in a non-contiguous array to fill spaces between the spaced beam spots.

29. The method of claim 26 wherein the each of the multiple beam distributed exposures includes spaced beam spots that produce corresponding melt balls having a smaller size than the beam spots, and wherein the multiple beam distributed exposures are overlayed such that the melt balls overlap to fill the spaces between the melt balls formed by a previous one of the distributed exposures.

30. A multiple beam additive manufacturing system comprising:
- a powder bed support system including at least a platform for supporting a powder bed and a three-dimensional structure formed therein and for moving the powder bed vertically and incrementally to accommodate multiple powder layers of powder material;
- a powder delivery system including at least a powder spreader for delivering each of the powder layers to form the powder bed;
- an array of light sources for generating light;
- an array of optical fibers coupled to the light sources, respectively;
- a multiple beam optical head including output ends of the optical fibers; and
- a control system including at least a CNC computer and/or microcontroller circuitry for controlling the array of light sources, the powder bed support system, and the powder delivery system in coordination to form build layers of the three-dimensional structure in each of the powder layers delivered to the powder bed, the control system being configured to selectively control each of the light sources to generate light from selected light sources in the array of light sources such that the light is emitted from the output ends of the optical fibers and directed to corresponding regions of each of the powder layers to perform multiple beam distributed exposures with distributed exposure patterns including spaced beam spots, wherein a power and duration of the light sources is controlled such that the beam spots melt the powder material in the corresponding regions of the powder layers causing the powder material to fuse in spaced fused regions that form voxels of the three-dimensional structure, wherein the control system is responsive to a build instruction file defining instructions to form each build layer of the three-dimensional structure from the powder layers, and wherein the build instruction file includes at least optical head positioning data defining a position of the optical head and light source data identifying the selected light sources and a power and exposure time for the selected light sources.

31. The multiple beam additive manufacturing system of claim 30 further comprising an optical head motion stage for moving the optical head relative to the powder layers on the powder bed support system to scan the beams of light across the powder layers.

32. The multiple beam additive manufacturing system of claim 30 further comprising a polygon scanner optically coupled to the optical head for scanning beams of light across the powder layers.

33. The multiple beam additive manufacturing system of claim 30 further comprising a galvo scanner optically coupled to the optical head for scanning beams of light across the powder layers.

34. The multiple beam additive manufacturing system of claim 30 wherein the output ends of the optical fibers are arranged in a two-dimensional array.

35. The multiple beam additive manufacturing system of claim 30 wherein the control system is configured to control power and exposure time of selected light sources in the array of light sources.

36. The multiple beam additive manufacturing system of claim 30 wherein each of the light sources is a diode laser.

37. The multiple beam additive manufacturing system of claim 30 wherein the optical head is coupled to the powder delivery system.

38. The multiple beam additive manufacturing system of claim 30 further comprising a processing chamber including a vacuum system for removing oxygen and a gas supply for supplying inert gas.

39. The multiple beam additive manufacturing system of claim 30 wherein the optical head positioning data includes scan pattern data defining an interleaved scan pattern across the powder layers such that spaced beam spots in the distributed exposures are interleaved in a non-contiguous array to fill spaces between the spaced beam spots.

* * * * *